United States Patent [19]

Sakaguchi

[11] Patent Number: 5,384,595
[45] Date of Patent: Jan. 24, 1995

[54] MOTION DETECTOR AND IMAGE STABILIZING SYSTEM

[75] Inventor: Takashi Sakaguchi, Osaka, Japan

[73] Assignee: Matsushita Electric Industrial Co., Ltd., Osaka, Japan

[21] Appl. No.: 987,874

[22] Filed: Dec. 9, 1992

Related U.S. Application Data

[62] Division of Ser. No. 685,796, Apr. 16, 1991, Pat. No. 5,204,741.

[30] Foreign Application Priority Data

Apr. 19, 1990 [JP] Japan .................................. 2-103453

[51] Int. Cl.⁶ .......................................... H04N 5/228
[52] U.S. Cl. ..................................... 348/208; 348/226; 348/241
[58] Field of Search .................... 358/105, 222, 213.18, 358/213.15, 213.19, 213.11, 213.23, 160, 167; 348/208, 226, 207, 241; H04N 5/228

[56] References Cited

U.S. PATENT DOCUMENTS

| | | | |
|---|---|---|---|
| 4,301,471 | 11/1981 | Holscher et al. | 358/105 |
| 4,562,475 | 12/1985 | Levine | 358/213 |
| 4,933,757 | 6/1990 | Kanno et al. | 358/98 |
| 4,992,855 | 2/1991 | Takei | 358/29 |

OTHER PUBLICATIONS

"The Electronic Picture Stabilizer" by K. Kai et al; ITEJ Technical Report vol. 11, No. 3, pp., 43–48; May 1987.

"Image Stabilizing Technology For Video Camera" by T. Inaji et al; ITEJ Technical Report vol. 11, No. 28, pp., 19–24 (Nov. 1987).

"Automatic Image Stabilizing System By Full-Digital Signal Processing" by K. Uomori et al; IEEE Transactions on Consumer Electronics, vol. 36, No. 3 Aug. 1990.

Primary Examiner—Michael T. Razavi
Assistant Examiner—Tuan V. Ho
Attorney, Agent, or Firm—Lowe, Price, LeBlanc & Becker

[57] ABSTRACT

A motion detector includes a flicker compensating circuit for removing flicker components from a video signal, and a motion vector detecting circuit for detecting a motion vector in response to an output signal from the flicker compensating circuit. An image stabilizing system includes a flicker compensating circuit for removing flicker components from a video signal, a motion vector detecting circuit for detecting a motion vector in response to an output signal from the flicker compensating circuit, and a motion compensating circuit for removing motion components from the video signal in response to the motion vector detected by the motion vector detecting circuit.

20 Claims, 17 Drawing Sheets

REPRESENTATIVE
POINT

WIDE IMAGE PICKUP ELEMENT ARRAY
READING AREA
NORMAL VIDEO AREA

MOTION DETECTOR AND IMAGE STABILIZING SYSTEM

This application is a divisional of application Ser. No. 07/685,796 filed Apr. 16, 1991, now U.S. Pat. No. 5,204,741.

BACKGROUND OF THE INVENTION

This invention relates to a motion detector operating with a video signal. This invention also relates to an image stabilizing system usable in video equipments such as a video camera.

Movement of a video camera causes unwanted fluctuation of images represented by a video signal outputted from the video camera. Various systems have been developed to compensate for such unwanted fluctuation of images.

ITEJ Technical Report, Vol. 11, No. 3, pages 43–48, May 1987, discloses a prior art system for removing unwanted fluctuation of images represented by a video signal. In this prior art system, an analog input video signal is converted by an A/D converter into a corresponding digital video signal which is fed to a Y/C separation circuit and a delay circuit. The Y/C separation circuit separates a Y signal from the digital video signal, and the Y signal is fed to a motion vector detector. The motion vector detector detects motion vectors of images while being subjected to control of a detection region. Corrective vectors are generated on the basis of the detected motion vectors. The output video signal from the delay circuit is processed in response to the corrective vectors so that the positions of the images will be corrected in response to the motion of the images. This prior art system requires a large-scale circuit since the motion vector detector and other devices are complicated in design.

ITEJ Technical Report, Vol. 11, No. 28, pages 19–24, November 1987, discloses a prior art image stabilizing technology for a video camera. In this prior art technology, fluctuation of a television camera is detected on the basis of the output signals from angular velocity sensors, and an image pickup unit of the television camera is moved in response to the detected fluctuation so that images represented by the output signal from the image pickup unit can be independent of the fluctuation of the camera.

IEEE Transaction on Consumer Electronics, Vol. 36, No. 3, August 1990, which is not prior art to this invention, discloses an automatic image stabilizing system. In this background system, motion of images represented by an input video signal is detected as motion vectors by a motion vector detector, and the video signal is processed in response to the motion vectors so that the positions of the images will be corrected in response to the motion of the images to remove unwanted fluctuation from the images. This background system can be composed of a small-scale circuit since the motion vector detector and other devices are simple in design.

Under conditions where an image of an object is picked up by a television camera having a vertical sync frequency of 60 Hz and the object is illuminated by a light source powered by a 50 Hz ac line electric energy, the image represented by the video signal outputted from the television camera is contaminated by 20 Hz flickers. The previously-mentioned prior art system and background system lack a device for removing such flickers. Therefore, in the previously-mentioned prior art system and background system, generated motion vectors tend to be inaccurate when an input video signal is contaminated by such flicker components. Also, the previously-mentioned prior art technology lacks a device for removing flickers.

SUMMARY OF THE INVENTION

It is an object of this invention to provide an improved motion detector.

It is another object of this invention to provide an improved image stabilizing system.

A first aspect of this invention provides a motion detector comprising a flicker compensating circuit for removing flicker components from a video signal; and a motion vector detecting circuit for detecting a motion vector in response to an output signal from the flicker compensating circuit.

A second aspect of this invention provides a video signal processing apparatus comprising a first flicker compensating circuit for removing flicker components from a video signal; a motion vector detecting circuit for detecting a motion vector in response to an output signal from the first flicker compensating circuit; a second flicker compensating circuit, being separate from the first flicker compensating circuit, for removing flicker components from the video signal; and a video signal processing circuit for processing an output signal from the second flicker compensating circuit.

A third aspect of this invention provides a motion detector comprising a sensor for sensing flickers; a flicker detection circuit for detecting flickers in response to an output signal from the sensor; a flicker compensating circuit for removing flicker components from a video signal in response to an output signal from the flicker detection circuit; and a motion vector detecting circuit for detecting a motion vector in response to an output signal from the flicker compensating circuit.

A fourth aspect of this invention provides a motion detector for use in combination with an image pickup device, and means for providing a variable electronic shutter to the image pickup device, the motion detector comprising a flicker detection circuit for detecting flicker components in an output signal of the image pickup device; a hold circuit for holding an output signal from the flicker detecting circuit; a flicker compensating circuit for removing the flicker components from the output signal of the image pickup device, the flicker compensating circuit comprising means for controlling the variable electronic shutter in response to an output signal from the hold circuit; and a motion vector detecting circuit for detecting a motion vector in response to an output signal from the flicker compensating circuit.

A fifth aspect of this invention provides an image stabilizing system comprising a flicker compensating circuit for removing flicker components from a video signal; a motion vector detecting circuit for detecting a motion vector In response to an output signal from the flicker compensating circuit; and a motion compensating circuit for removing motion components from the video signal in response to the motion vector detected by the motion vector detecting circuit.

A sixth aspect of this invention provides an image stabilizing system comprising a sensor for sensing flickers; a flicker detection circuit for detecting flickers in response to an output signal from the sensor; a flicker compensating circuit for removing flicker components from a video signal in response to an output signal from the flicker detection circuit; a motion vector detecting circuit for detecting a motion vector in response to an output signal from the flicker compensating circuit: and a motion compensating circuit for removing motion components from the video signal in response to the motion vector detected by the motion vector detecting circuit.

A seventh aspect of this invention provides an image stabilizing system for use in combination with an image pickup device, and means for providing a variable electronic shutter to the image pickup device, the motion detector comprising a flicker detection circuit for detecting flicker components in an output signal of the image pickup device; a hold circuit for holding an output signal from the flicker detecting circuit; a flicker compensating circuit for removing the flicker components from the output signal of the image pickup device, the flicker compensating circuit comprising means for controlling the variable electronic shutter in response to an output signal from the hold circuit; a motion vector detecting circuit for detecting a motion vector in response to an output signal from the flicker compensating circuit; and a motion compensating circuit for removing motion components from the video signal in response to the motion vector detected by the motion vector detecting circuit.

DESCRIPTION OF THE FIRST PREFERRED EMBODIMENT

Figure 1:
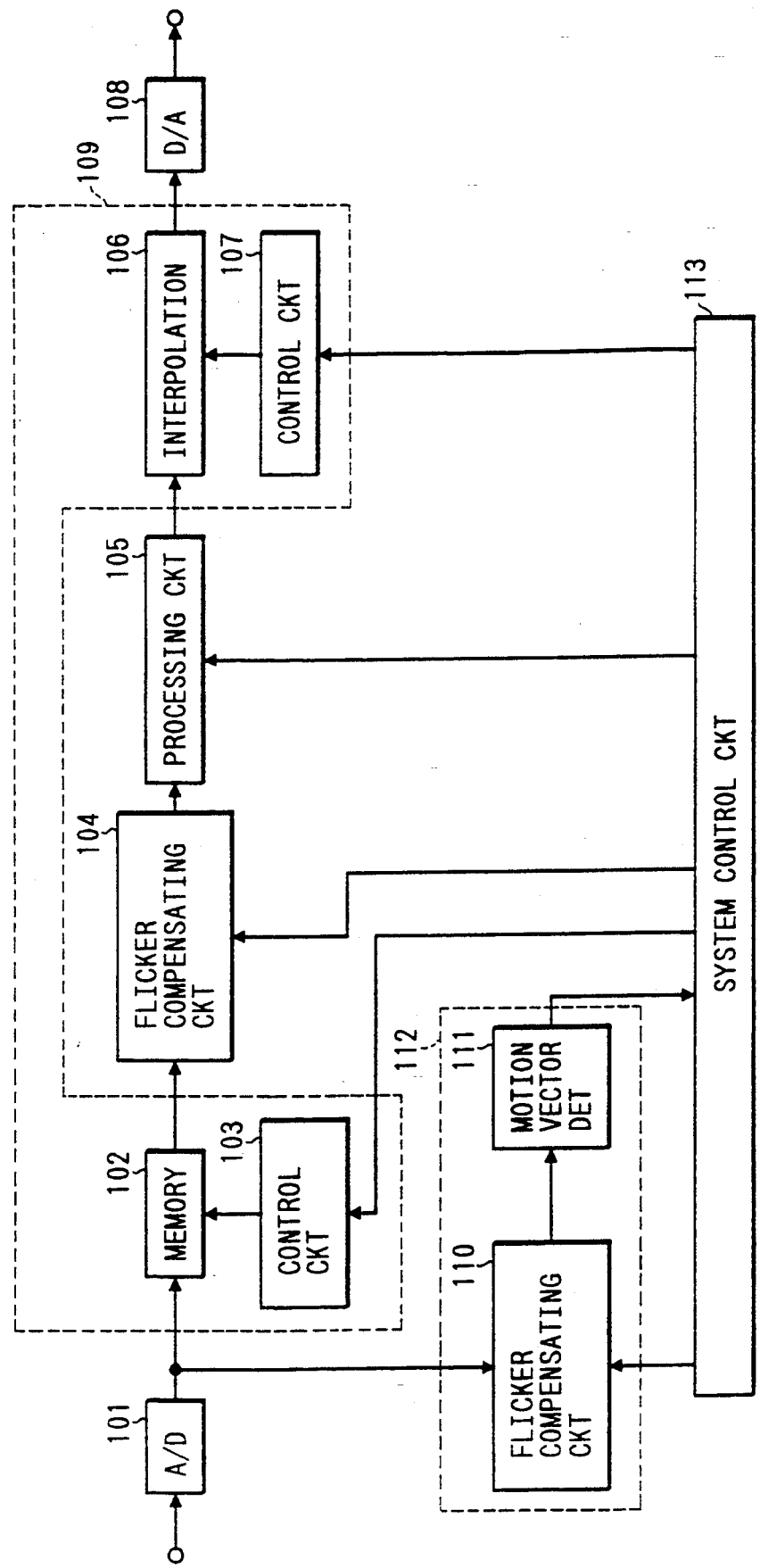
FIG. 1 is a block diagram of an image stabilizing system according to a first embodiment of this invention.

With reference to FIG. 1, an image stabilizing system includes an analog-to-digital converter (an A/D converter) 101, a memory circuit 102, a memory control circuit 103, a flicker compensating circuit 104, a signal processing circuit 105, an interpolation circuit 106, an interpolation control circuit 107, a digital-to-analog converter (a D/A converter) 108, a flicker compensating circuit 110, a motion vector detecting circuit 111, and a system control circuit 113. The memory circuit 102, the memory control circuit 103, the interpolation circuit 106, and the interpolation control circuit 107 compose a motion compensating circuit 109. The flicker compensating circuit 110 and the motion vector detecting circuit 111 compose a motion detector 112. The memory circuit 102 is controlled in response to output signals from the memory control circuit 103. The interpolation circuit 106 is controlled in response to output signals from the interpolation control circuit 107. The memory control circuit 103, the flicker compensating circuit 104, the signal processing circuit 105, the interpolation control circuit 107, and the flicker compensating circuit 110 are controlled by the system control circuit 113.

An input analog video signal coming from a video camera and an image pickup device (not shown) is converted by the A/D converter 101 into a corresponding digital video signal which is fed to the memory circuit 102 and the flicker compensating circuit 110. The flicker compensating circuit 110 attenuates or removes flicker components from the digital video signal, outputting a flicker-free video signal to the motion vector detecting circuit 111. The motion vector detecting circuit ill detects motion vectors of images represented by the flicker-free video signal. Data representing the detected motion vectors are fed from the motion vector detecting circuit 111 to the system control circuit 113. The motion vector data are used by the system control circuit 113 in controlling the memory control circuit 103, the signal processing circuit 105, and the interpolation control circuit 107. The system control circuit 113 detects unwanted camera's fluctuation from the motion vector data, and the system control circuit 113 controls the memory control circuit 103 in response to the detected camera's fluctuation.

The digital video signal outputted from the A/D converter 101 is written into the memory circuit 102. The digital video signal is read out from the memory circuit 102. The digital video signal read out from the memory circuit 102 is fed to the flicker compensating circuit 104. The memory circuit 102 includes a field memory, a frame memory, or another suitable memory. Writing and reading the signals into and from the memory circuit 102 are controlled by write and read control signals outputted from the memory control circuit 103. In addition, storage locations of the memory circuit 102 into which pixel-corresponding time segments of the signal are written are designated by address signals outputted from the memory control circuit 103. Further, storage locations of the memory circuit 102 from which pixel-corresponding time segments of the signal are read out are designated by address signals outputted from the memory control circuit 103. The memory control circuit 103 generates the write control signal, the read control signal, and the address signals on the basis of output signals from the system control circuit 113 which depend on the detected camera's fluctuation. The positions of the images relative to a frame can be varied by controlling the address signals designating the storage locations of the memory circuit 102 from which the time segments of the signal are read out. These address signals are controlled in response to the camera's fluctuation so that the positions of the images will be adjusted in response to the camera's fluctuation to compensate for the camera's fluctuation. In other words, the memory readout position or the memory reading area is controlled in response to the camera's fluctuation to compensate for the camera's fluctuation. Thus, a fluctuation-compensated video signal is outputted from the memory circuit 102 to the flicker compensating circuit 104. The memory circuit 102, the memory control circuit 103, and the system control circuit 113 can be corresponding parts of an automatic image stabilizing system in IEEE Transaction on Consumer Electronics, Vol. 36, No. 3, August 1990, the disclosure of which is hereby incorporated by reference.

The flicker compensating circuit 104 attenuates or removes flicker components from the fluctuation-compensated video signal, outputting a flicker-free video signal to the signal processing circuit 105. The signal processing circuit 105 includes a known Y/C separation circuit, separating the flicker-free video signal into a Y signal (a luminance signal) and a C signal (a color signal). The Y signal and the C signal are subjected by the interpolation circuit 106 to an interpolation process and an expanding process. The resultant Y and C signals are combined into a standard-format composite video signal, which is converted by the D/A converter 108 into a corresponding analog video signal. The interpolation process and the expanding process executed by the interpolation circuit 106 are controlled by the interpolation control circuit 107 in response to output signals from the system control circuit 113 which depend on the detected motion vectors. The interpolation circuit 106, the interpolation control circuit 107, and the system control circuit 113 can be corresponding parts of an automatic image stabilizing system in IEEE Transaction on Consumer Electronics, Vol. 36, No. 3, August 1990, the disclosure of which is hereby incorporated by reference.

Figure 2:
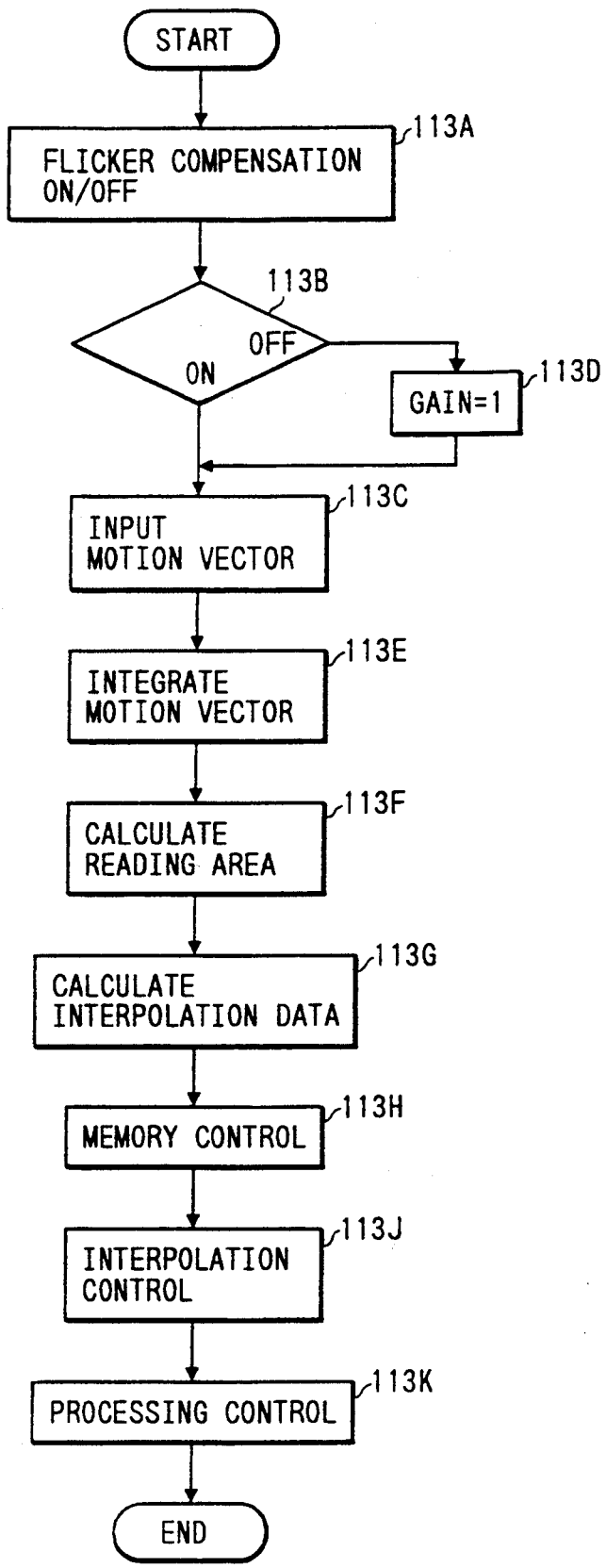
FIG. 2 is a flowchart of a program controlling the system control circuit of FIG. 1.

The system control circuit 113 includes a microcomputer having a combination of an I/O circuit, a CPU, a ROM, and a RAM. The system control circuit 113 operates in accordance with a program stored in the ROM. FIG. 2 is a flowchart of this program.

As shown in FIG. 2, a first step 113A of the program receives a flicker compensation ON/OFF signal which can be generated by a suitable device such as a flicker sensor or a manual switch (not shown) connected to the system control circuit 113. A step 113B following the step 113A decides whether the flicker compensation ON/OFF signal represents an ON condition or an OFF condition. When the flicker compensation ON/OFF signal represents the ON condition, the program advances from the step 113B to a step 113C. When the flicker compensation ON/OFF signal represents the OFF condition, the program advances from the step 113B to a step 113D. The step 113D sets gains of gain control circuits within the flicker compensating circuits 104 and 110 equal to a fixed value of 1 to disable the flicker compensating circuits 104 and 110. After the step 113D, the program advances to the step 113C. The step 113C receives the output data of the motion vector detecting circuit 111 which represent motion vectors. A step 113E following the step 113C executes a process of integrating the motion vectors to derive an integrated motion vector. A step 113F following the step 113E calculates a memory reading area on the basis of the integrated motion vector. A step 113G following the step 113F calculates interpolation data on the basis of the result of the calculation by the previous step 113F. A step 113H following the step 113G controls the memory control circuit 103 in response to the memory reading area calculated by the previous step 113F. A step 113J following the step 113H controls the interpolation control circuit 107 in response to the interpolation data calculated by the previous step 113G. After the step 113J, the program advances to a final step 113K which controls the signal processing circuit 105. The execution of the sequence of the steps 113A–113K is periodically reiterated.

Figure 3:
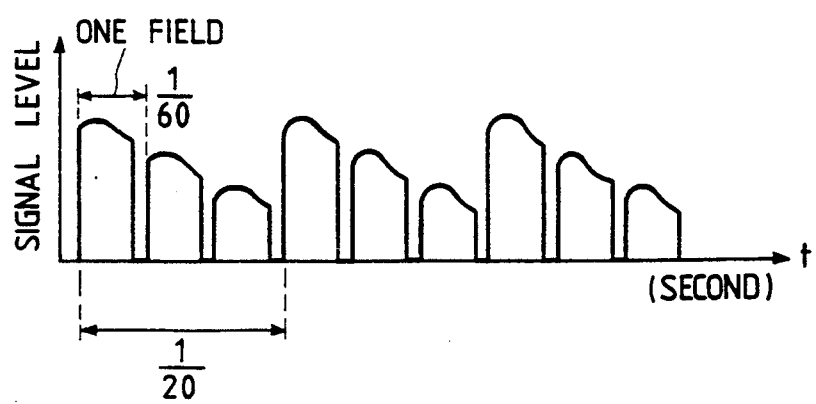
FIG. 3 is a time-domain diagram of a video signal which occurs in the presence of flickers.

Under conditions where an image of an object is picked up by a television camera having a vertical sync frequency of 60 Hz and the object is illuminated by a light source powered by a 50 Hz ac line electric energy, 20 Hz flicker components are caused in the video signal outputted from the television camera as shown in FIG. 3. The flicker compensating circuits 104 and 110 function to suppress such flicker components. The flicker compensating circuit 110 is preferably designed so that its flicker removing ability will be lower than the flicker removing ability of the other flicker compensating circuit 104. The flicker compensating circuits 104 and 110 have similar structures, and only the flicker compensating circuit 110 will be described in detail hereinafter.

Figure 4:
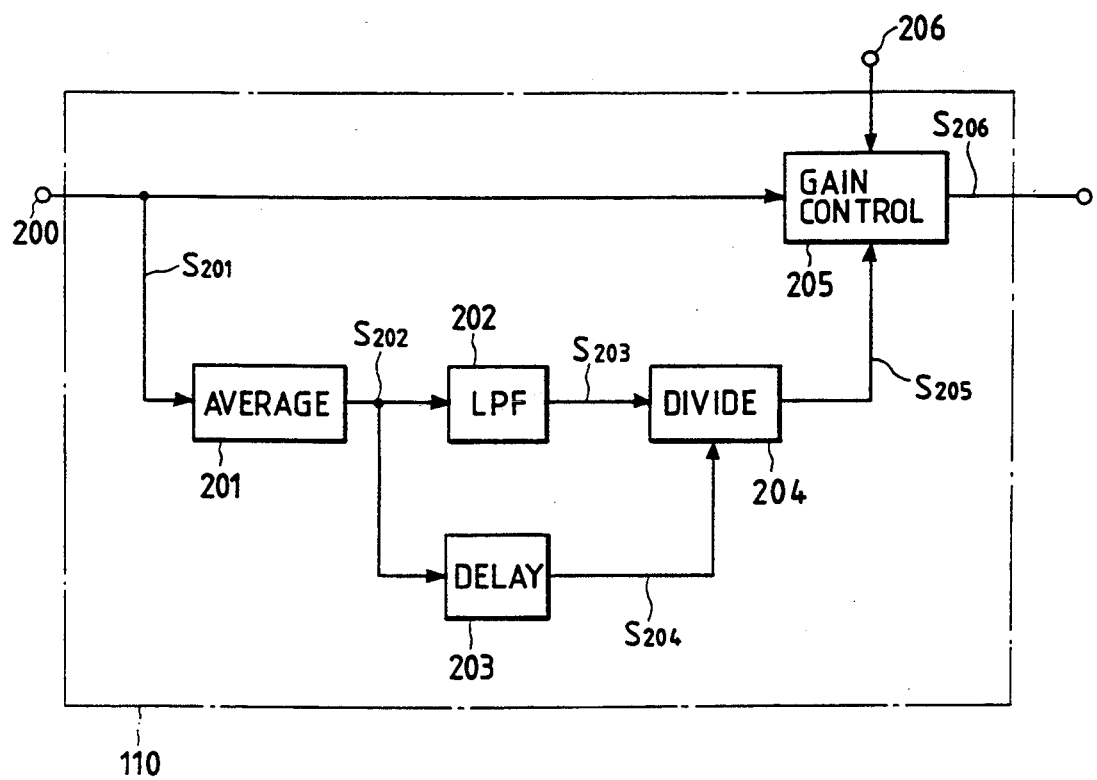
FIG. 4 is a block diagram of one of the flicker compensating circuits of FIG. 1.

As shown in FIG. 4, the flicker compensating circuit 110 includes an input terminal 200, an averaging circuit 201, an LPF (a low pass filter) 202, a delay circuit 203, a dividing circuit 204, a gain control circuit 205, and a control terminal 206. The video signal S201 outputted from the A/D converter 101 is fed via the input terminal 200 to the averaging circuit 201 and the gain control circuit 205. The gain control circuit 205 conducts or attenuates the video signal S201 by multiplying the video signal S201 by a gain which is varied in the range of 0 to 1 in response to the output signal S205 from the dividing circuit 204. The gain of the gain control circuit 205 can be set to 1 by the output signal from the system control circuit 113 which is fed via the control terminal 206. The output signal S206 from the gain control circuit 205 is used as the output signal from the flicker compensating circuit 110. The averaging circuit 201 averages the video signal S201 over a one-field period. The LPF 202 removes flicker components from the output signal S202 of the averaging circuit 201. The delay circuit 203 delays the output signal S202 of the averaging circuit 201. The dividing circuit 204 executes a division between the output signals S203 and S204 from the LPF 202 and the delay circuit 203.

Figure 5:
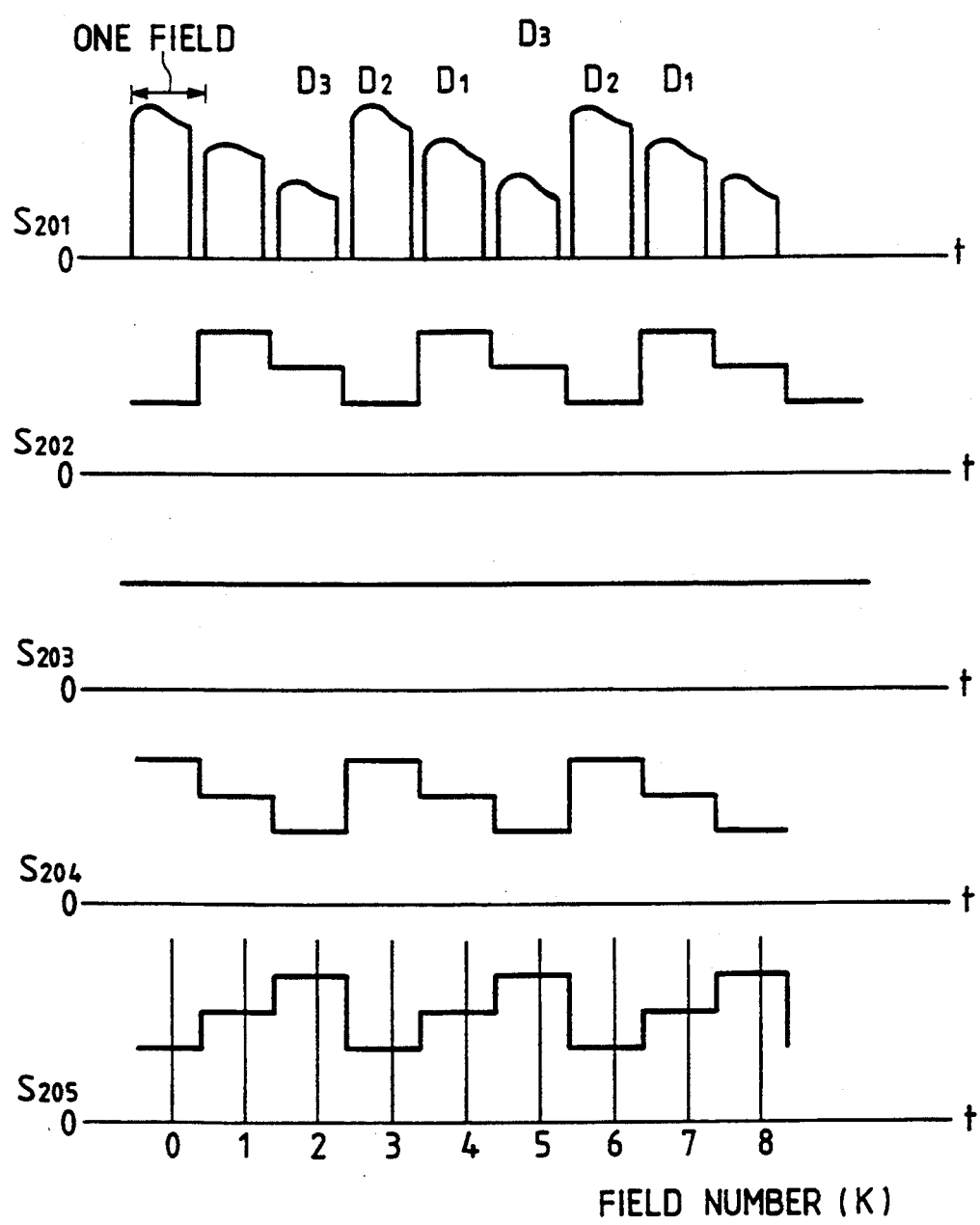
FIG. 5 is a time-domain diagram of various signals in the flicker compensating circuit of FIG. 4.

It is now assumed that, as shown in FIG. 5, the video signal S201 has flicker components. The signal S201 which occurs during a field is expressed as follows.

$$S201[K] = I[K] \cdot SO[K]$$

where K denotes a field number, and I[K] and SO[K] denote flicker components and non-flicker components (true signal components). The averaging circuit 201 averages the video signal S201 over a one-field period, and the output signal S202 from the averaging circuit 201 is expressed as follows.

$$S202[K] = (S201[K-1])$$
$$= (I[K-1] \cdot SO[K-1])$$

Since there is no correlation between the flicker components I[K-1] and the signal components SO[K-1], the output signal S202 from the averaging circuit 201 is expressed as follows.

$$S202[K] = (I[K-1]) \cdot (SO[K-1])$$

Since the flicker components I[K-1] remain constant during a one-field period, the output signal S202 from the averaging circuit 201 is expressed as follows.

$$S202[K] = I[K-1] \cdot (SO[K-1])$$

Thus, as also shown in FIG. 5, the output signal S202 from the averaging circuit 201 follows the video signal S201 by a one-field time lag. The LPF 202 removes the flicker components from the signal S202, and outputting the signal S203. The output signal S203 from the LPF 202 is expressed as follows.

$$S203[K] = \{S202[K-1] + S202[K-2] + S202[K-3]\}/3$$
$$= \{I[K-2] \cdot (SO[K-2]) + I[K-3] \cdot (SO[K-3]) + I[K-4] \cdot (SO[K-4])\}/3$$

Since the signal components are highly correlated between adjacent fields, the following equations are approximately good.

$$(SO[K-2]) = (SO[K-3]); \; (SO[K-4]) = (SO[K-3])$$

Thus, the output signal S203 from the LPF 202 is expressed as follows.

$$S203[K] = \{I[K-2] + I[K-3] + I[K-4]\} \cdot (SO[K-3])/3$$

Since the flicker components reiterate at a three-field period as shown in FIG. 5 and the average of the flicker components over a three-field interval is equal to 1, the following relation is satisfied.

$$I[K-2] + I[K-3] + I[K-4] = 3$$

Therefore, the output signal S203 from the LPF 202 is expressed as follows.

$$S203[K] = (SO[K-3])$$

Thus, as also shown in FIG. 5, the level represented by the signal S203 remains constant. The delay circuit 203 delays the signal S202 by a two-field period so that the phase of the output signal S204 from the delay circuit S204 will be matched to the phase of the output signal S203 from the 202. The output signal S204 from the delay circuit 203 expressed as follows.

$$S204[K] = S202[K-2]$$
$$= I[K-3] \cdot (SO[K-3])$$

Thus, as also shown in FIG. 5, the signal S204 follows the signal S202 by a two-field interval. The dividing circuit 204 divides the signal S203 by the signal S204, outputting the signal S205. The output signal S205 from the dividing circuit 204 is expressed as follows.

$$S205[K] = S203[K]/S204[K]$$
$$= (SO[K-3])/I[K-3] \cdot (SO[K-3])$$

Since the periodicity of the flicker components results in the relation "I[K]=I[K-3]", the output signal S205 from the dividing circuit 204 is expressed as follows.

$$S205[K] = 1/I[K]$$

Thus, as also shown in FIG. 5, the signal S205 represents the reciprocal of the flicker components. In this way, the flicker components are detected. The signal S205 is used by the gain control circuit 205 as a gain. The gain control circuit 205 multiplies the video signal S201 and the signal S205, outputting the signal S206. The output signal S206 from the gain control circuit 205 is expressed as follows.

$$S206[K] = S201[K] \cdot S205[K]$$
$$= I[K] \cdot SO[K]/I[K]$$
$$= SO[K]$$

In this way, the flicker components are removed from the video signal S201. The resultant flicker-compensated signal S206 is outputted from the flicker compensating circuit 110 to the motion vector detecting circuit 111.

It should be noted that the flicker compensating circuit 110 may be provided at other locations such as a location preceding the memory circuit 102, a location following the interpolation circuit 106, or a location following the D/A converter 108.

Figure 6:
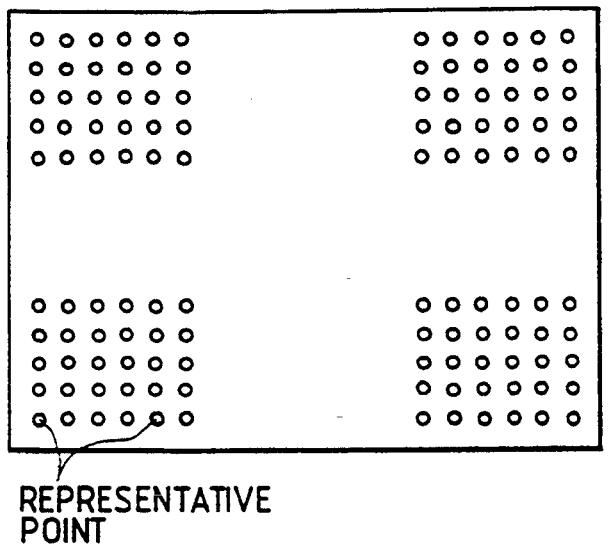
FIG. 6 is a diagram showing representative points in a field.

It is preferable that the motion vector detecting circuit 111 uses a BERP (band extract representative point) matching technique in which four motion vector detecting sections are used for each field, and 30 representative points (6 horizontal points by 5 vertical points) are contained in each of the motion vector detecting sections as shown in FIG. 6.

Figure 7:
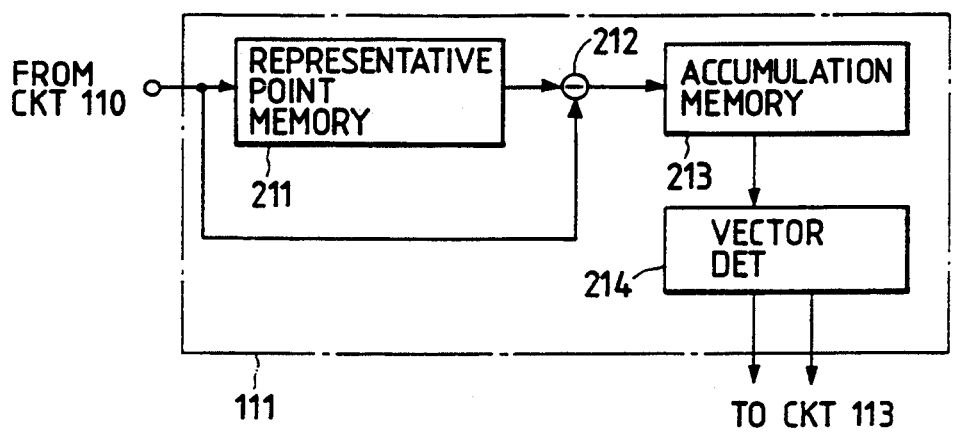
FIG. 7 is a block diagram of the motion vector detecting circuit of FIG. 1.

As shown in FIG. 7, the motion vector detecting circuit 111 includes a memory circuit 211, a subtracter 212, a memory circuit 213, and a vector detecting circuit 214. The flicker-compensated output signal from the flicker compensating circuit 110 is fed to the memory circuit 211 and the subtracter 212. The memory circuit 211 temporarily stores data of the flicker-compensated signal which correspond to the representative points. The data at the representative points of the preceding field are fed from the memory circuit 211 to the subtracter 212. The subtracter 212 calculates the differences between the data of the flicker-compensated signal of the present field and the data at the representative points of the preceding field. The output difference signal from the subtracter 212 is accumulated by the memory circuit 213. The vector detecting circuit 214 derives motion vectors from the output signal of the memory circuit 213. The derived motion vectors are fed to the system control circuit 113.

Figure 8:
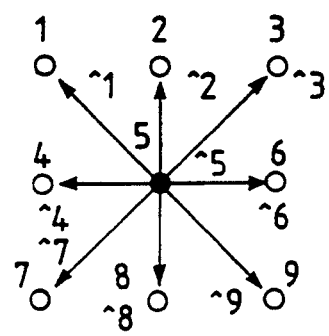
FIG. 8 is a diagram showing the relation between a representative point and motion vectors.

FIG. 8 shows the relation between a representative point and motion vectors. In FIG. 8, there are nine pixels denoted by numerals 1-9 respectively, and the pixel 5 corresponds to the representative point. In the case where the signal at the representative point 5 moves to the positions of the pixels 1, 2, 3, 4, 6, 7, 8, and 9 as the present field is replaced by a next field, the motion vectors are denoted by the characters ̄1, ̄2, ̄3, ̄4, ̄6, ̄7, ̄8, and ̄9 respectively. In the case where the signal at the representative point 5 remains at the position of the pixel 5 as the present field is replaced by a next field, the motion vector is denoted by the character ̄5. In the latter case, the motion quantity is equal to 0, and the image is still.

Figure 9:
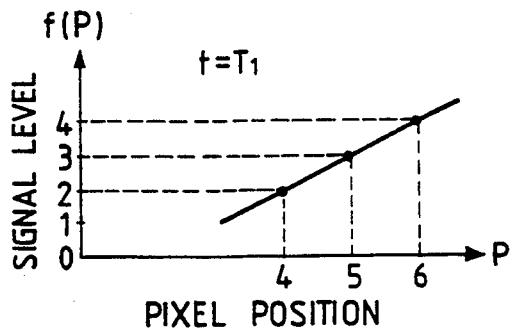
FIG. 9 and FIG. 10 are diagrams showing examples of signal levels at representative points and some pixels.
Figure 10:
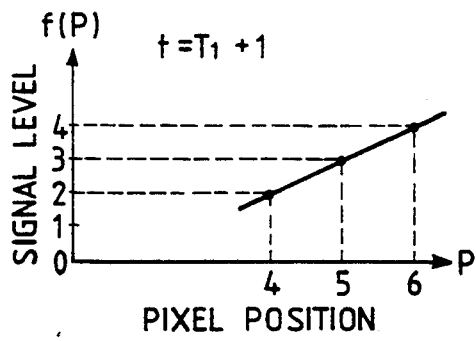
Figure 11:
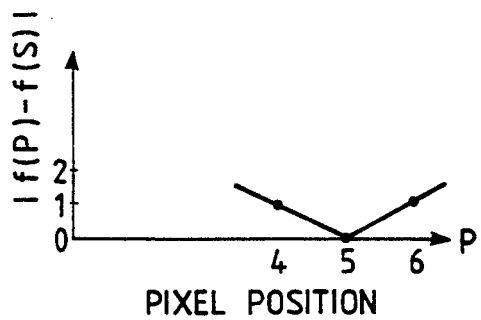
FIG. 11 is a diagram showing an example of the result of the calculation by the subtracter of FIG. 7.
Figure 12:
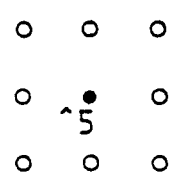
FIG. 12 is a diagram showing an example of the detected motion vector.

It is now assumed that the image is still and the flicker components are absent, and that the data at the pixels 4, 5, and 6 represent signal levels at a moment T1 as shown in FIG. 9. In this case, the data at the pixels 4, 5, and 6 remain unchanged, and represent the same signal levels at a subsequent moment T1+1 as shown in FIG. 10. Further, the results of the calculation by the subtracter 212 have values as shown in FIG. 11, and the detected motion vector corresponds to the motion vector ̄5 which is equal to 0 as shown in FIG. 12.

Figure 13:
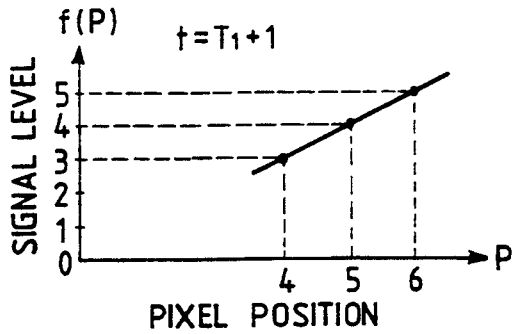
FIG. 13 is a diagram showing an example of signal levels at representative points and some pixels.
Figure 14:
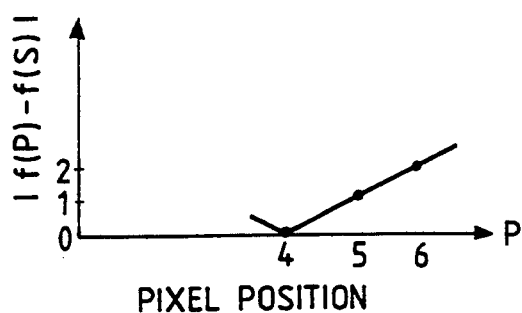
FIG. 14 is a diagram showing an example of the result of the calculation by the subtracter of FIG. 7.
Figure 15:
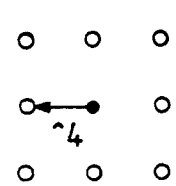
FIG. 15 is a diagram showing an example of the detected motion vector.

It is now assumed that the image is still and the flicker components are present, and that the data at the pixels 4, 5, and 6 represent signal levels at a moment T1 as shown in FIG. 9. In this case, the data at the pixels 4, 5, and 6 change, and represent new signal levels at a subsequent moment T1+1 as shown in FIG. 13. Further, the results of the calculation by the subtracter 212 have values as shown in FIG. 14, and the detected motion vector corresponds to the motion vector ̄4 which differs from 0 as shown in FIG. 15. Thus, the flicker components tend to cause inaccurate detection of a motion vector. In this embodiment, since the flicker compensating circuit 110 removes the flicker components from the video signal fed to the motion vector detecting circuit 111, accurate detection of motion vectors is enabled and the fluctuation compensating process is reliably executed regardless of a presence of flickers.

It should be noted that the signal processing circuit 105 may be provided at other locations such as a location between the A/D converter 101 and the memory circuit 102, a location preceding the A/D converter 101, or a location following the D/A converter 108.

DESCRIPTION OF THE SECOND PREFERRED EMBODIMENT

Figure 16:
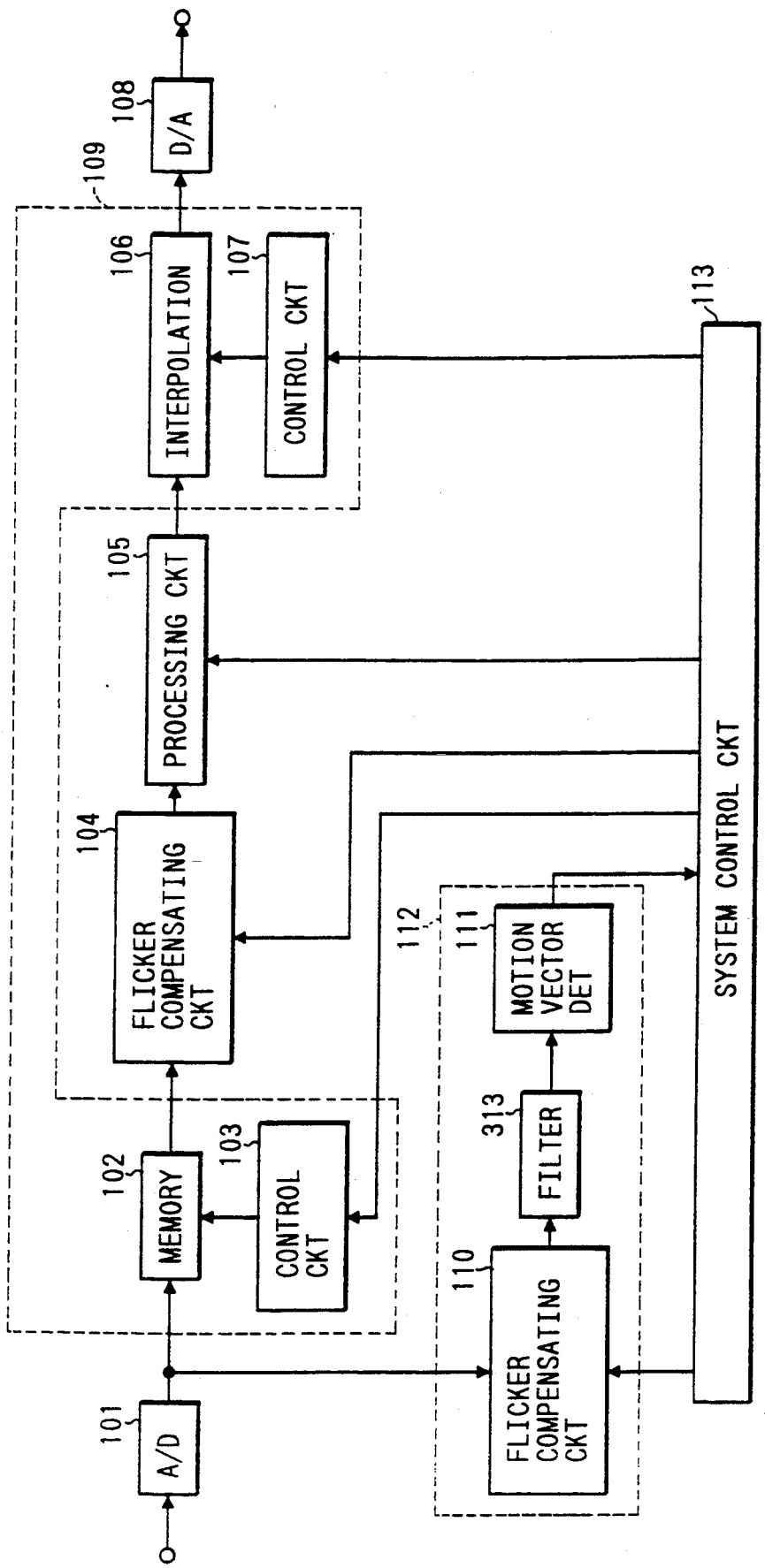
FIG. 16 is a block diagram of an image stabilizing system according to a second embodiment of this invention.
Figure 17:
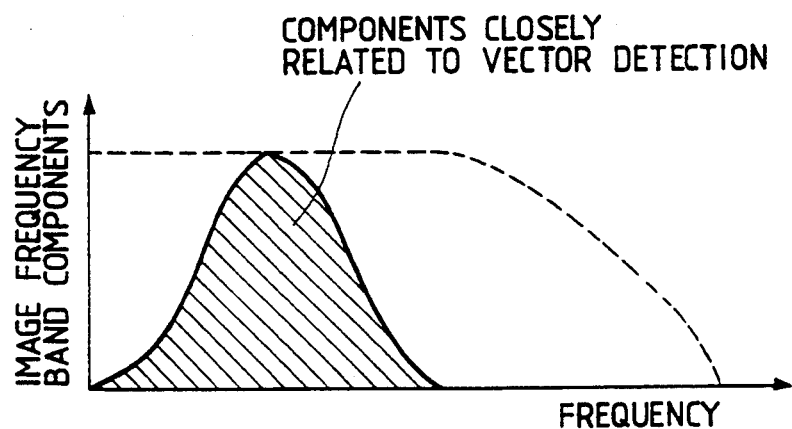
FIG. 17 is a frequency-domain diagram showing characteristics of the filter of FIG. 16.

FIG. 16 shows a second embodiment of this invention which is similar to the embodiment of FIGS. 1-15 except that a band pass filter 313 is added between a flicker compensating circuit 110 and a motion vector detecting circuit 111. As shown in FIG. 17, the filter 313 conducts a predetermined frequency band which is closely related to the detection of motion vectors. Specifically, the filter 313 removes noise and extends edges in images, enabling accurate detection of motion vectors by use of a smaller number of representative points.

DESCRIPTION OF THE THIRD PREFERRED EMBODIMENT

Figure 18:
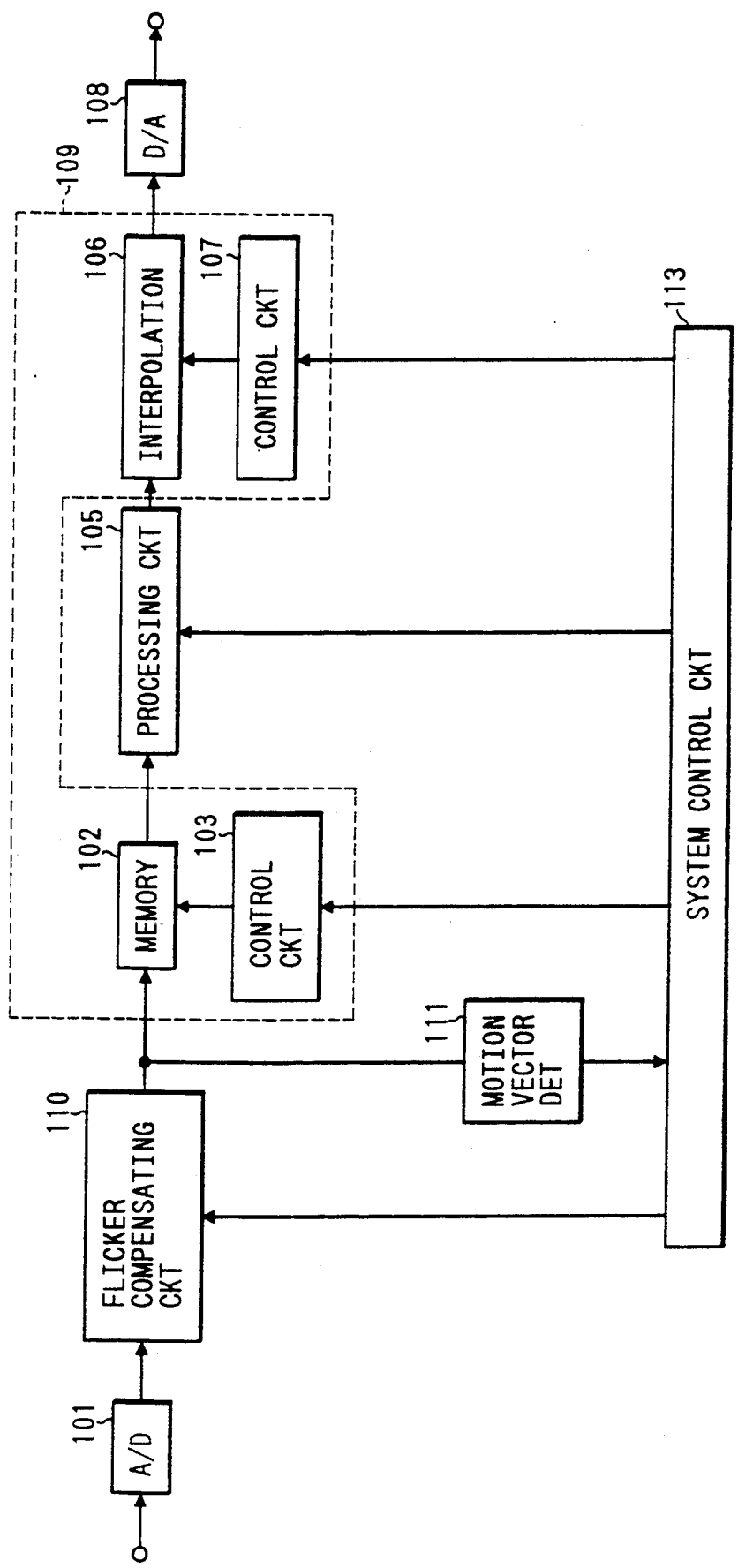
FIG. 18 is a block diagram of an image stabilizing system according to a third embodiment of this invention.

FIG. 18 shows a third embodiment of this invention which is similar to the embodiment of FIGS. 1-15 except for the following design changes. In the embodiment of FIG. 18, a flicker compensating circuit 104 (see FIG. 1) is removed, and a memory circuit 102 and a signal processing circuit 105 are directly coupled. Further, the input terminal of the memory circuit 102 is disconnected from an A/D converter 101 and is connected to the output terminal of a flicker compensating circuit 110. Thus, the output signal from the flicker compensating circuit 110 is written into the memory circuit 102.

DESCRIPTION OF THE FOURTH PREFERRED EMBODIMENT

Figure 19:
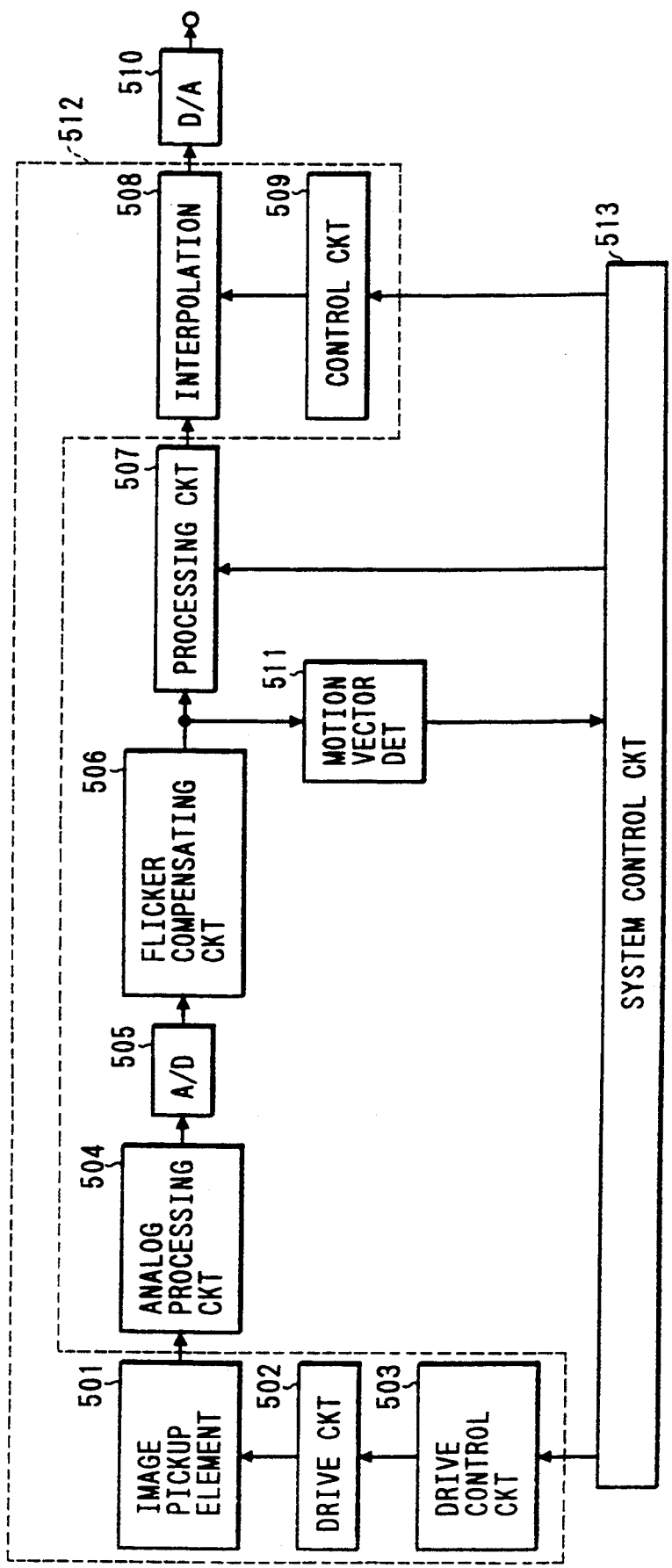
FIG. 19 is a block diagram of an image stabilizing system according to a fourth embodiment of this invention.

With reference to FIG. 19, an image stabilizing system includes an image pickup device (an image pickup element array) 501, a drive circuit 502, a drive control circuit 503, an analog-signal processing circuit 504, an analog-to-digital converter (an A/D converter) 505, a flicker compensating circuit 506, a signal processing circuit 507, an interpolation circuit 508, an interpolation control circuit 509, a digital-to-analog converter (a D/A converter) 510, a motion vector detecting circuit 511, and a system control circuit 513. The image pickup element array 501, the drive circuit 502, the drive control circuit 503, the interpolation circuit 508, and the interpolation control circuit 509 compose a motion compensating circuit 512. The image pickup element array 501 is provided in a television camera. For example, the image pickup element array 501 is composed of a CCD imager arrangement. The image pickup element array 501 can be driven by the output signals from the drive circuit 502. The drive circuit 502 is controlled by the drive control circuit 503. The interpolation circuit 508 is controlled in response to output signals from the interpolation control circuit 509. The drive control circuit 503, the signal processing circuit 507, and the interpolation control circuit 509 are controlled by the system control circuit 513.

The output signal from the image pickup element array 501 is fed to the analog-signal processing circuit 504, being converted by the analog-signal processing circuit 504 into an analog video signal of a predetermined format. The analog video signal outputted from the analog-signal processing circuit 504 is converted by the A/D converter 505 into a corresponding digital video signal which is fed to the flicker compensating circuit 506. The flicker compensating circuit 506 is similar to the flicker compensating circuit 110 of FIGS. 1 and 4. The flicker compensating circuit 506 attenuates or removes flicker components of the digital video signal, outputting a flicker-free video signal to the signal processing circuit 507 and the motion vector detecting circuit 511. The motion vector detecting circuit 511 is similar to the motion vector detecting circuit 111 of FIG. 1. The motion vector detecting circuit 511 detects motion vectors of images represented by the flicker-free video signal. Data representing the detected motion vectors are fed from the motion vector detecting circuit 511 to the system control circuit 513. The motion vector data are used by the system control circuit 513 in controlling the drive control circuit 503, the signal processing circuit 507, and the interpolation control circuit 509. The system control circuit 513 detects unwanted camera's fluctuation from the motion vector data, and the system control circuit 513 controls the drive control circuit 503 in response to the detected camera's fluctuation.

The signal processing circuit 507 includes a known Y/C separation circuit, separating the flicker-free video signal into a Y signal (a luminance signal) and a C signal (a color signal). The Y signal and the C signal are subjected by the interpolation circuit 508 to an interpolation process and an expanding process. The resultant Y and C signals are combined into a standard-format composite video signal, which is converted by the D/A converter 510 into a corresponding analog video signal. The interpolation process and the expanding process executed by the interpolation circuit 508 are controlled by the interpolation control circuit 509 in response to output signals from the system control circuit 513 which depend on the detected motion vectors. The interpolation circuit 508 and the interpolation control circuit 509 are similar to the interpolation circuit 106 and the interpolation control circuit 107 of FIG. 1 respectively.

Figure 20:
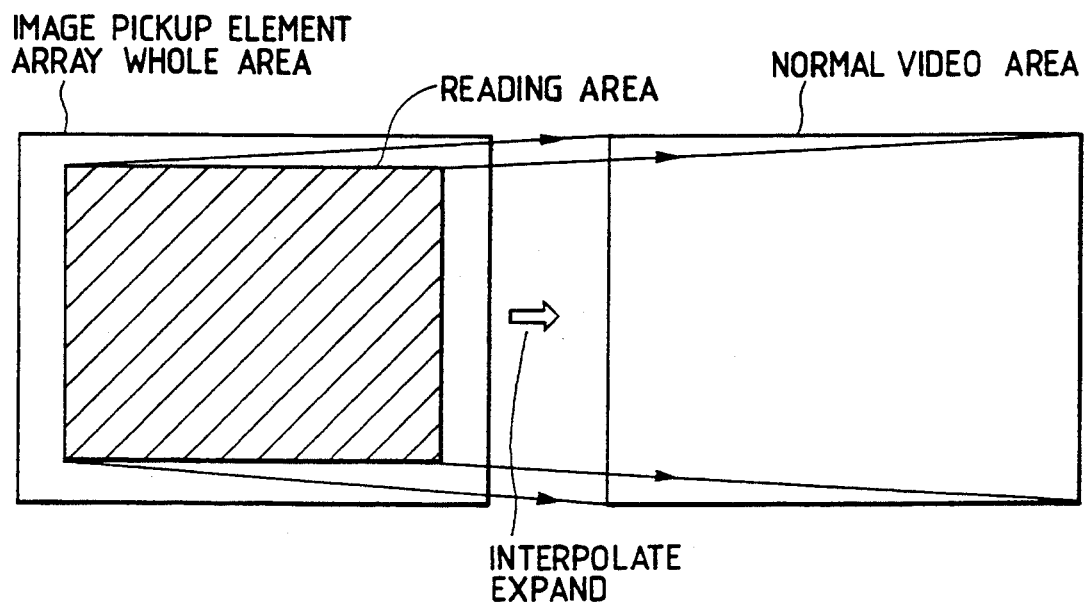
FIG. 20 is a diagram showing the relation among the whole area of the image pickup element array, the reading area, and the video area which occurs after an interpolation process in the image stabilizing system of FIG. 19.

As shown in FIG. 20, a reading area is provided within the whole area of the image pickup element array 501. The drive circuit 502 selects a predetermined number of elements from all the elements of the array 501 as active elements determining the reading area. The drive circuit 502 can change the selected elements so that the reading area is movable. The devices 502, 503, 513, and 511 cooperate to move the reading area in response to the detected motion vectors to compensate for the detected camera's fluctuation. The video signal corresponding to the reading area is subjected to the interpolation process and the expanding process by the interpolation circuit 508, being converted into the video signal corresponding to a normal full video area as shown in FIG. 20.

Figure 21:
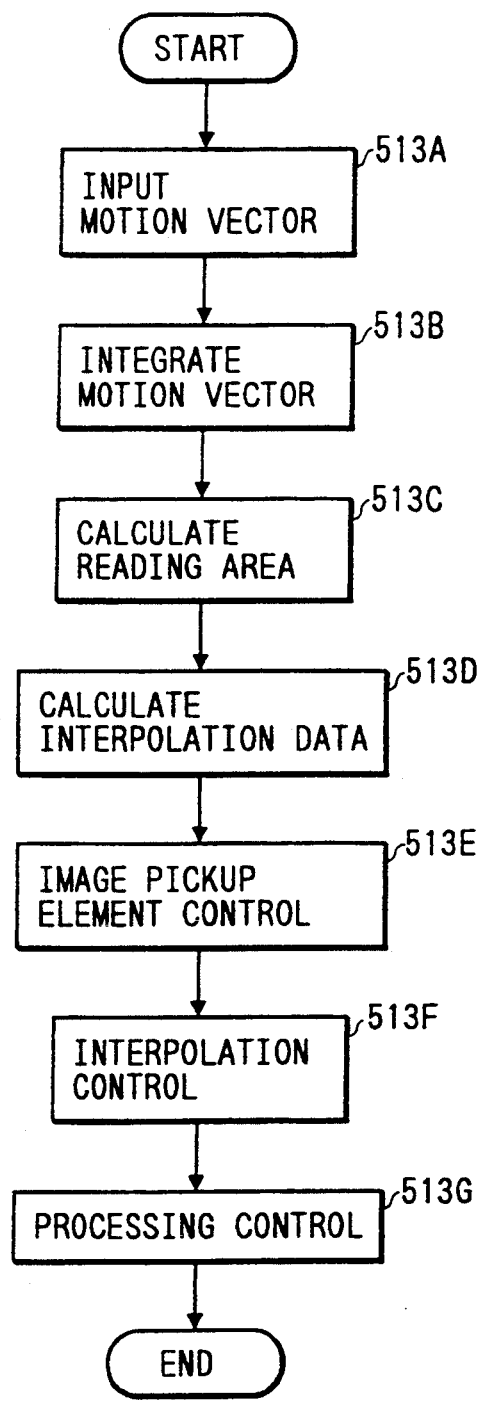
FIG. 21 is a flowchart of a program controlling the system control circuit of FIG. 19.

The system control circuit 513 includes a microcomputer having a combination of an I/O circuit, a CPU, a ROM, and a RAM. The system control circuit 513 operates in accordance with a program stored in the ROM. FIG. 21 is a flowchart of this program.

As shown in FIG. 21, a first step 513A of the program receives the output data of the motion vector detecting circuit 511 which represent motion vectors. A step 513B following the step 513A executes a process of integrating the motion vectors to derive an integrated motion vector. A step 513C following the step 513B calculates a reading area on the basis of the integrated motion vector. A step 513D following the step 513C calculates interpolation data on the basis of the result of the calculation by the previous step 513C. A step 513E following the step 513D controls the drive control circuit 503 in response to the memory reading area calculated by the previous step 513C. A step 513F following the step 513E controls the interpolation control circuit 509 in response to the interpolation data calculated by the previous step 513D. After the step 513F, the program advances to a final step 513G which controls the signal processing circuit 507. The execution of the sequence of the steps 513A–513G is periodically reiterated.

Under conditions where an image of an object is picked up by a television camera having a vertical sync frequency of 60 Hz and the object is illuminated by a light source powered by a 50 Hz ac line electric energy, 20 Hz flicker components are caused in the video signal outputted from the television camera. The flicker compensating circuit 506 functions to remove such flicker components. Since the flicker components are thus removed from the video signal fed to the motion vector detecting circuit 511, accurate detection of motion vectors is enabled and the fluctuation compensating process is reliably executed regardless of a presence of flickers. In addition, since the flicker components are removed from the video signal fed to the signal processing circuit 507, the interpolation circuit 508 following the signal processing circuit 507 can generate a video signal free from flickers.

DESCRIPTION OF THE FIFTH PREFERRED EMBODIMENT

Figure 22:
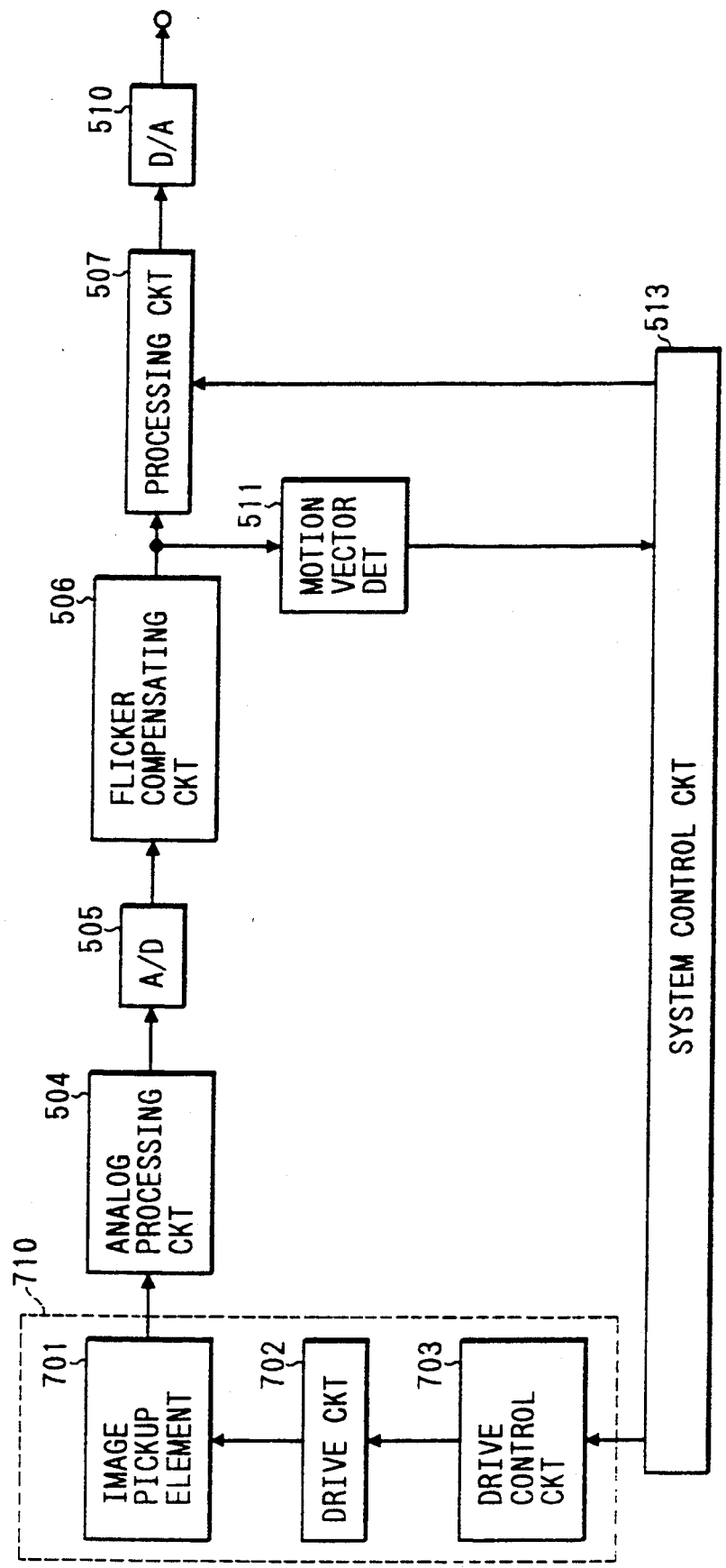
FIG. 22 is a block diagram of an image stabilizing system according to a fifth embodiment of this invention.

FIG. 22 shows a fifth embodiment of this invention which is similar to the embodiment of FIGS. 19–21 except for the following design changes. In the embodiment of FIG. 22, an interpolation circuit 508 and an interpolation control circuit 509 (see FIG. 19) are removed, and a signal processing circuit 507 and a D/A converter 510 are directly coupled to each other. The embodiment of FIG. 22 includes an image pickup array 701, a drive circuit 702, and a drive control circuit 703 which compose a motion compensating circuit 710.

Figure 23:
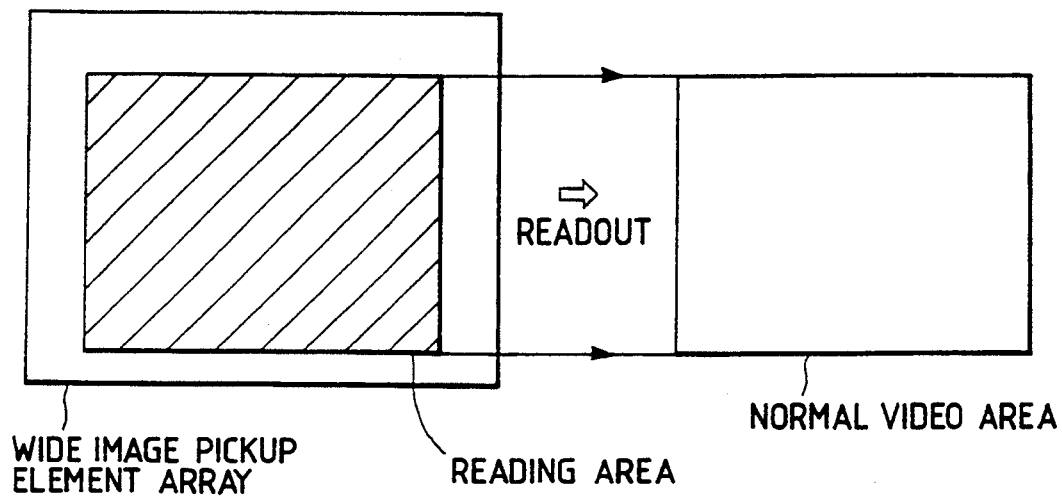
FIG. 23 is a diagram showing the relation among the whole area of the image pickup element array, the reading area, and the normal video area in the image stabilizing system of FIG. 22.

As shown in FIG. 23, the whole area of the image pickup element array 701 is greater than a normal television full area, and a reading area is provided within the whole area of the image pickup array 701. The reading area is equal in size to the normal television full area. Therefore, it is unnecessary to provide the interpolation circuit 508 and the interpolation control circuit 509 (see FIG. 19). The drive circuit 702 and the drive control circuit 703 are modified from the drive circuit 502 and the drive control circuit 503 so as to match with the wider-area image pickup element array 701.

DESCRIPTION OF THE SIXTH PREFERRED EMBODIMENT

Figure 24:
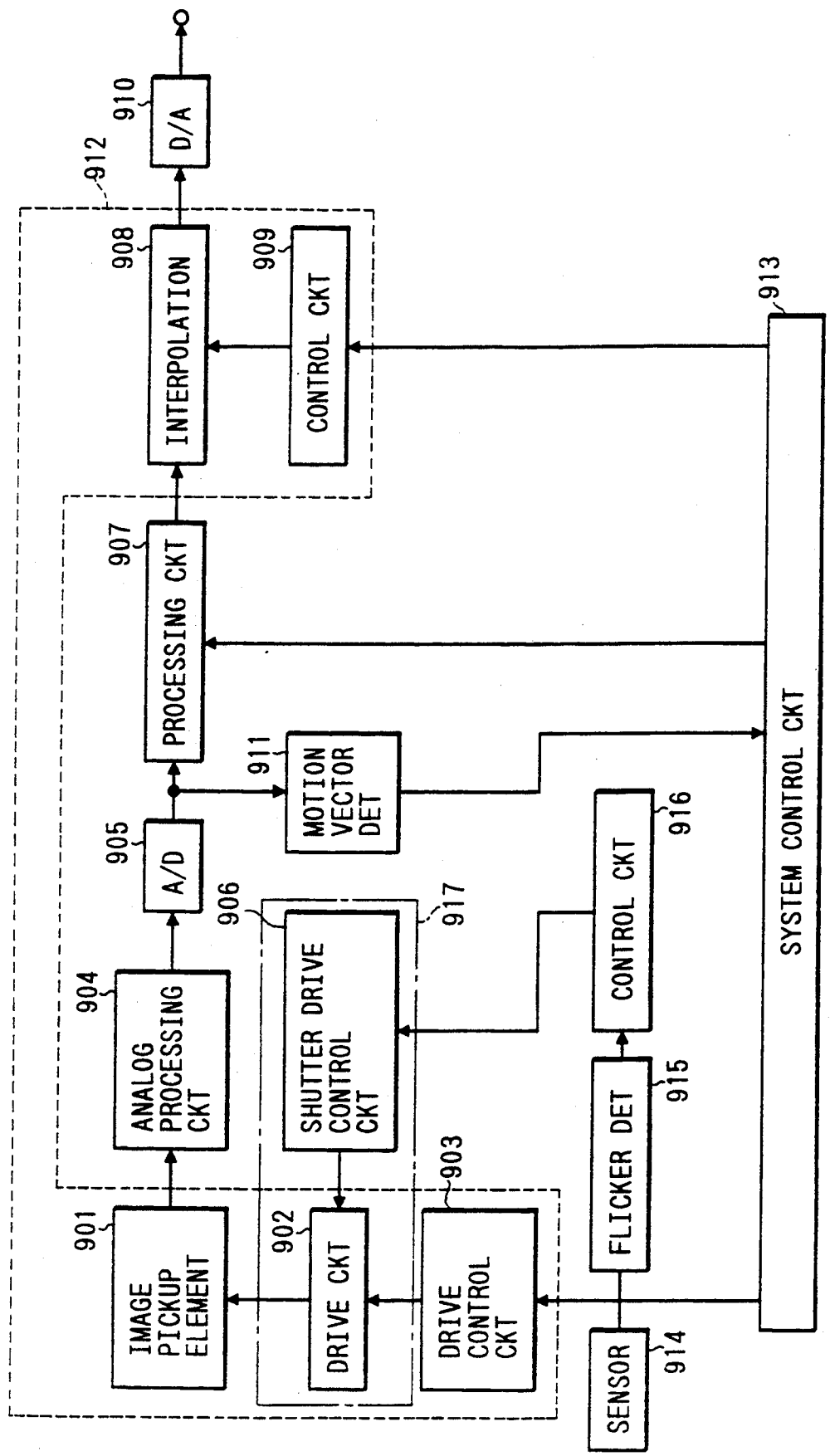
FIG. 24 is a block diagram of an image stabilizing system according to a sixth embodiment of this invention.

With reference to FIG. 24, an image stabilizing system includes an image pickup element array 901, a drive circuit 902, a drive control circuit 903, an analog-signal processing circuit 904, an analog-to-digital converter A/D converter) 905, an electronic shutter drive control circuit 906, a signal processing circuit 907, an interpolation circuit 908, an interpolation control circuit 909, a digital-to-analog converter (a D/A converter) 910, a motion vector detecting circuit 911, a system control circuit 913, a sensor 914, a flicker detection circuit 915, and a control circuit 916. The image pickup element array 901, the drive circuit 902, the drive control circuit 903, the interpolation circuit 908, and the interpolation control circuit 909 compose a motion compensating circuit 912. The image pickup element array 901 is provided in a television camera. The image pickup elements in the array 901 can be driven by the output signals from the drive circuit 902. The drive circuit 902 is controlled by the drive control circuit 903. The interpolation circuit 908 is controlled in response to output signals from the interpolation control circuit 909. The drive control circuit 903, the signal processing circuit 907, and the interpolation control circuit 909 are controlled by the system control circuit 913.

The image pickup element array 901 is composed of a solid-state imager arrangement such as a CCD imager arrangement, being periodically subjected to an electronic shuttering process. The period of the execution of the shuttering process determines a charge storage time (a charge storage period), The array drive circuit 902 and the electronic shutter drive control circuit 906 compose a flicker compensating circuit 917. The array drive circuit 902 controls the charge storage time of the image pickup element array 901 in response to the output signal from the electronic shutter drive control circuit 906. The sensor 914 includes a photo-to-electric transducer, detecting light illuminating an object, the image of which is picked up by the television camera. When the illumination light is generated from a light source powered by an ac electric energy, the output signal from the sensor 914 has a frequency equal to the frequency of the ac electric energy. The flicker detection circuit 915 compares the frequency of the output signal from the sensor 914 and the vertical sync frequency of the television camera, detecting whether or not flickers can be present and also detecting the frequency of the flickers when the flickers can be present. The control circuit 916 controls the electronic shutter drive control circuit 906 in response to the output signal from the flicker detection circuit 915. The devices 902, 906, 914, 915, and 916 cooperate to control the charge storage time in response to the detected possible flickers.

Figure 25:
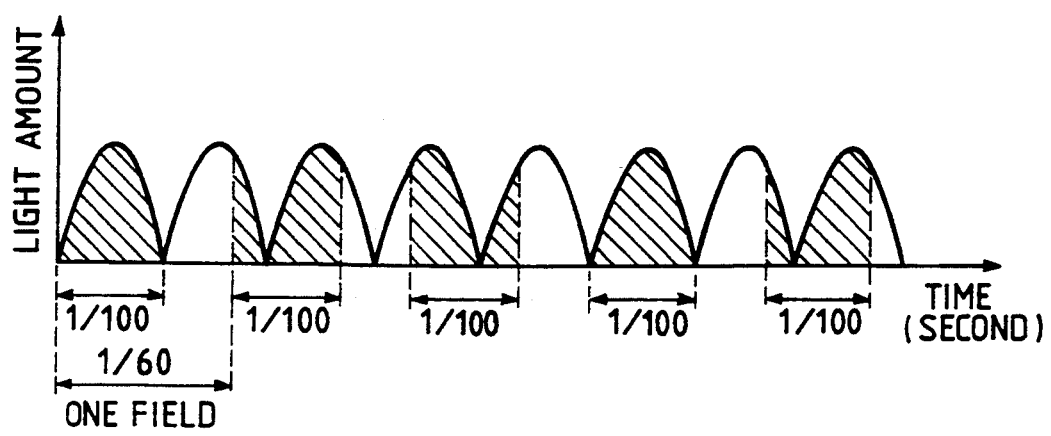
FIG. 25 is a time-domain diagram showing the operation of an electronic shutter acting on the image pickup element array in the image stabilizing system of FIG. 24.

Under conditions where an image of an object is picked up by a television camera having a vertical sync frequency of 60 Hz and the object is illuminated by a light source powered by a 50 Hz ac line electric energy, the intensity of the illumination light has a period of 1/100 second as shown in FIG. 25. Under these conditions, when the charge storage time is equal to 1/60 second, the output signal from the image pickup element array 901 has 20 Hz flicker components. Under the same conditions, when the charge storage time is equal to 1/100 second, the output signal from the image pickup element array 901 is free from the 20 Hz flicker components. In this embodiment, the charge storage time is controlled in response to the possible flickers so that the output signal from the image pickup element array 901 can be free from the flicker components.

The flicker-free output signal from the image pickup element array 901 is fed to the analog-signal processing circuit 904, being converted by the analog-signal processing circuit 904 into an analog video signal of a predetermined format. The analog video signal outputted from the analog-signal processing circuit 904 is converted by the A/D converter 905 into a corresponding digital video signal which is fed to the signal processing circuit 907 and the motion vector detecting circuit 911.

The motion vector detecting circuit 911 is similar to the motion vector detecting circuit 111 of FIG. 1. The motion vector detecting circuit 911 detects motion vectors of images represented by the flicker-free video signal. Data representing the detected motion vectors are fed from the motion vector detecting circuit 911 to the system control circuit 913. The motion vector data are used by the system control circuit 913 in controlling the drive control circuit 903, the signal processing circuit 907, and the interpolation control circuit 909. The system control circuit 913 detects unwanted camera's fluctuation from the motion vector data, and the system control circuit 913 controls the drive control circuit 903 in response to the detected camera's fluctuation.

The signal processing circuit 907 includes a known Y/C separation circuit, separating the flicker-free video signal into a Y signal (a luminance signal) and a C signal (a color signal). The Y signal and the C signal are subjected by the interpolation circuit 908 to an interpolation process and an expanding process. The resultant Y and C signals are combined into a standard-format composite video signal, which is converted by the D/A converter 910 into a corresponding analog video signal. The interpolation process and the expanding process executed by the interpolation circuit 908 are controlled by the interpolation control circuit 909 in response to output signals from the system control circuit 913 which depend on the detected motion vectors. The interpolation circuit 908 and the interpolation control circuit 909 are similar to the interpolation circuit 106 and the interpolation control circuit 107 of FIG. 1 respectively.

A reading area is provided within the whole area of the image pickup element array 901. The drive circuit 902 selects a predetermined number of elements from all the elements of the array 901 as active elements determining the reading area. The drive circuit 902 can change the selected elements so that the reading area is movable. The devices 902, 903, 913, and 911 cooperate to move the reading area in response to the detected motion vectors to compensate for the detected camera's fluctuation. The video signal corresponding to the reading area is subjected to the interpolation process and the expanding process by the interpolation circuit 908, being converted into the video signal corresponding to a normal full video area.

The system control circuit 913 includes a microcomputer. The operation of the system control circuit 913 is similar to the operation of the system control circuit 513 of FIG. 19.

As described previously, the flicker compensating circuit 917 prevents the output signal of the image pickup element array 901 from being contaminated by flicker components. Since the flicker components are thus removed from the video signal fed to the motion vector detecting circuit 911, accurate detection of motion vectors is enabled and the fluctuation compensating process is reliably executed regardless of a presence of flickers. In addition, since the flicker components are removed from the video signal fed to the signal processing circuit 907, the interpolation circuit 908 following the signal processing circuit 907 can generate a video signal free from flickers.

DESCRIPTION OF THE SEVENTH PREFERRED EMBODIMENT

Figure 26:
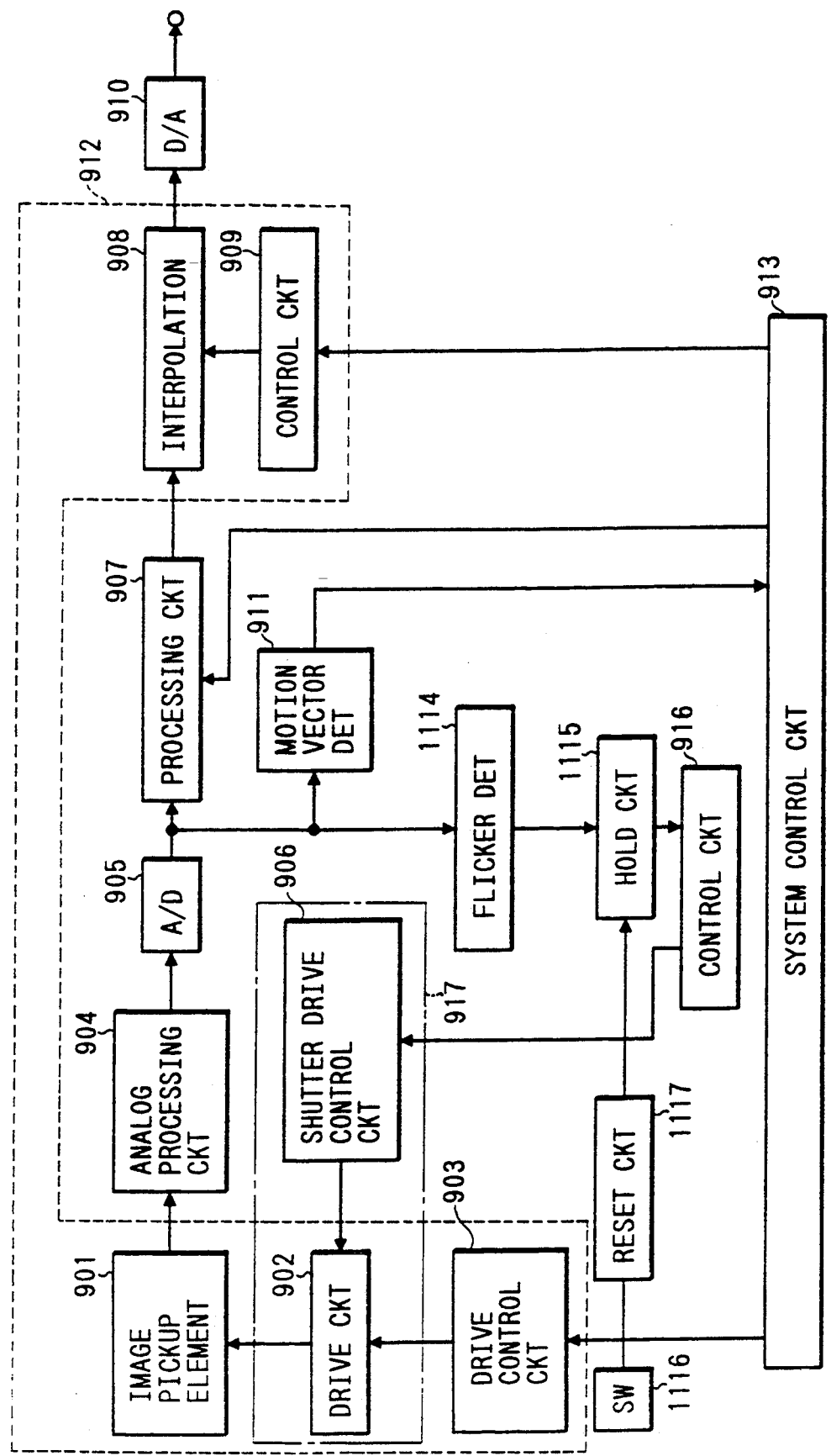
FIG. 26 is a block diagram of an image stabilizing system according to a seventh embodiment of this invention.

FIG. 26 shows a seventh embodiment of this invention which is similar to the embodiment of FIGS. 24 and 25 except for the following design changes. A sensor 914 and a flicker detection circuit 915 (see FIG. 24) are removed from the embodiment of FIG. 26. In the embodiment of FIG. 26, a flicker detection circuit 1114 includes a band pass filter, detecting whether or not flicker components are present in the output signal from an A/D converter 905. When the presence of flicker components is detected, the flicker detection circuit 1114 outputs a flicker detection signal to a hold circuit 1115. The hold circuit 1115 holds the flicker detection signal, and transfers the flicker detection signal to a control circuit 916. The control circuit 916 controls an electronic shutter drive control circuit 906 in response to the flicker detection signal so that the flicker components can be removed from the output signal of an image pickup element array 901.

The embodiment of FIG. 26 includes a television camera power supply switch 1116, and a reset circuit 1117 connected to the power supply switch 1116. When the power supply switch 1116 is moved to an ON position, the reset circuit 1117 outputs a reset signal to the hold circuit 1115 and thereby resets the hold circuit 1115. The hold circuit 1115 continues to feed the flicker detection signal to the control circuit 916 and thus the flicker removing process remains executed until the hold circuit 115 is reset by the reset circuit 1117. During the period after the hold circuit 1117 is reset, when a flicker is detected again, the related flicker detection signal is held by the hold circuit 1115.

DESCRIPTION OF THE EIGHTH PREFERRED EMBODIMENT

Figure 27:
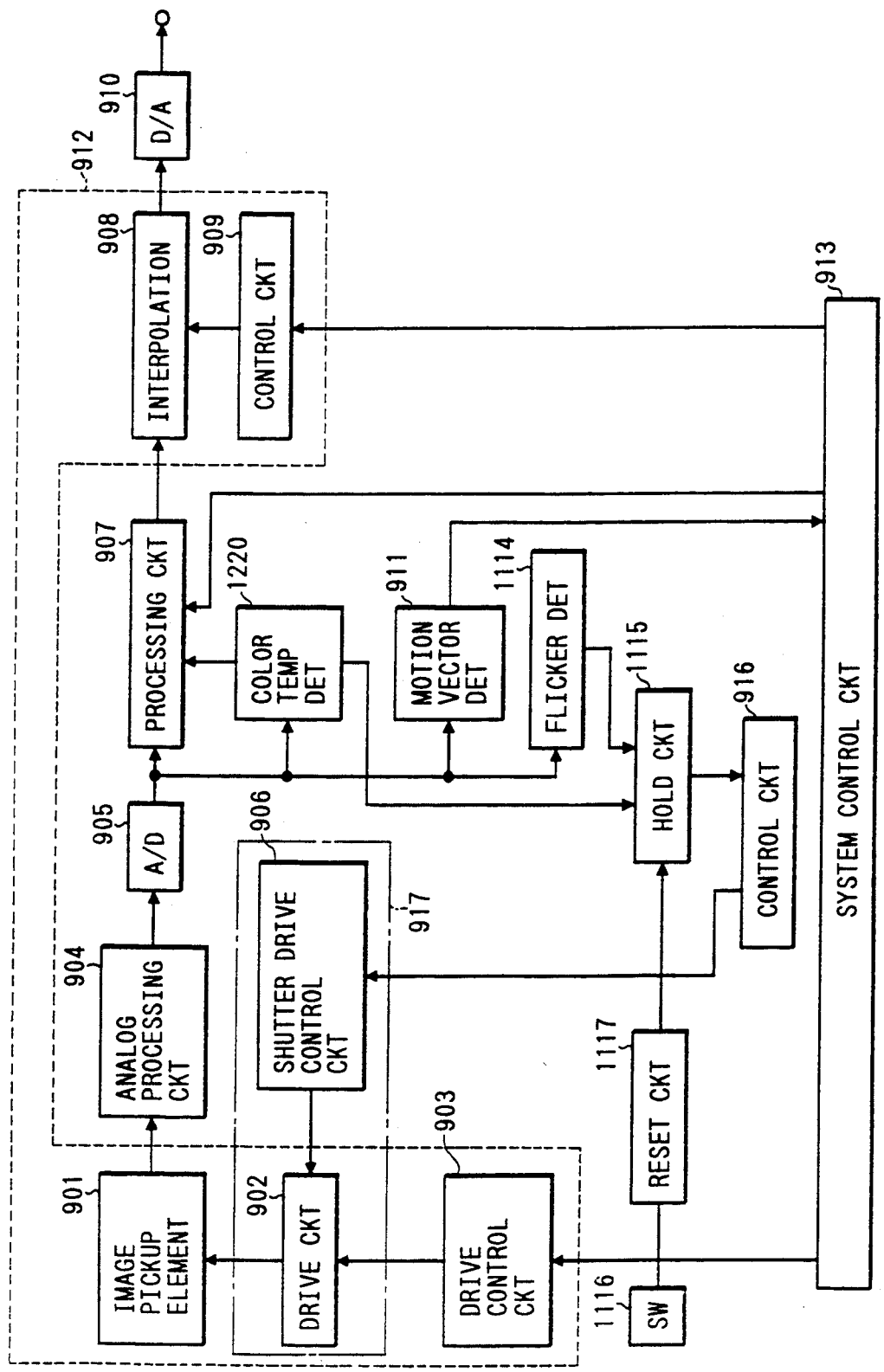
FIG. 27 is a block diagram of an image stabilizing system according to an eighth embodiment of this invention.

FIG. 27 shows an eighth embodiment of this invention which is similar to the embodiment of FIG. 26 except for the following design changes. The embodiment of FIG. 27 includes a color temperature detection circuit 1220 which detects the ratio between a color difference signal "R-Y" and a color difference signal "B-Y" of the output signal from an A/D converter 908, and which derives color temperature information from the detected ratio. The color temperature detection circuit 1220 controls a signal processing circuit 907 in response to the derived color temperature information to execute a white balance process. In addition, when the derived color temperature varies over a predetermined range, the color temperature detection circuit 1220 outputs a reset signal to a hold circuit 1115 and thus resets the hold circuit 1115 to interrupt a flicker removing process.

In general, when a color temperature varies greatly, for example, when a television camera is moved into the outdoors, conditions causing flickers disappear. According to this embodiment of this invention, in such a case, the color temperature detection circuit 1220 outputs a reset signal to the hold circuit 1115 so that the flicker removing process is stopped. When a flicker is detected again, the flicker removing process is restarted.

DESCRIPTION OF THE NINTH PREFERRED EMBODIMENT

Figure 28:
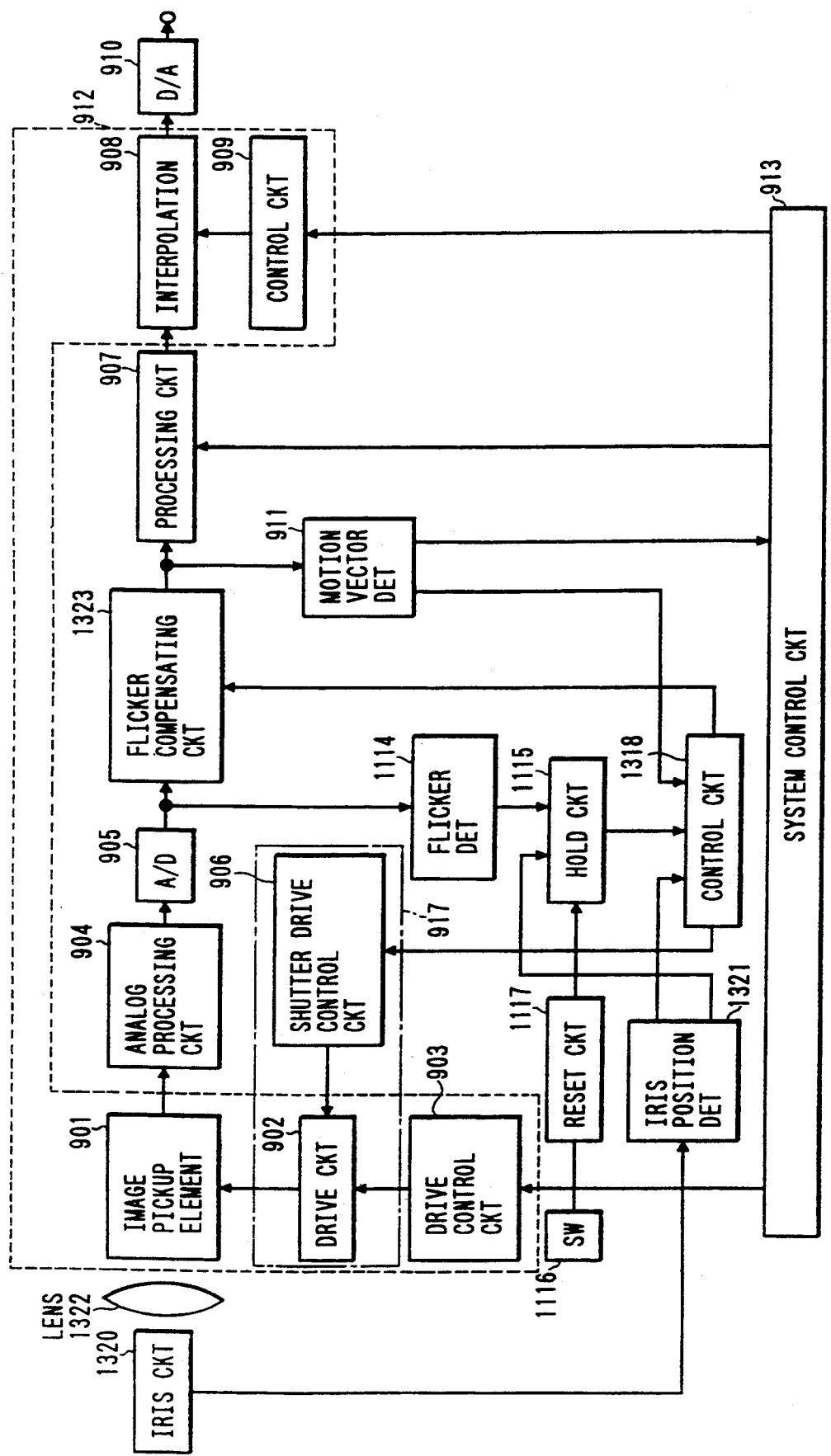
FIG. 28 is a block diagram of an image stabilizing system according to a ninth embodiment of this invention.

FIG. 28 shows a ninth embodiment of this invention which Is similar to the embodiment of FIG. 26 except for the following design changes. The embodiment of FIG. 28 includes an iris circuit 1320, an iris position detecting circuit 1321, a lens 1322, and a flicker compensating circuit 1323. The iris circuit 1320 is associated with an iris. The iris, the lens 1322, and an image pickup element array 901 are arranged in the order along the direction of travel of light representing an image of an object. The iris position detecting circuit 1321 derives information of an iris value, that is, information of the brightness of the object, from the output signal of the iris circuit 1320. The output signal from an A/D converter 905 is processed by the flicker compensating circuit 1323. The flicker compensating circuit 1323 is similar to the flicker compensating circuit 104 of FIG. 1. The output signal from the flicker compensating circuit 1323 is fed to a signal processing circuit 907 and a motion vector detecting circuit 911. A control circuit 1318 controls an electronic shutter drive control circuit 906 and the flicker compensating circuit 1323 in response to the output signals from the motion vector detecting circuit 911, a hold circuit 1115, and the iris position detecting circuit 1321.

Under conditions where the output signal from the iris position detecting circuit 1321 represents that the brightness of the object is great, when the control circuit 1318 receives a flicker detection signal from the hold circuit 1115, the control circuit 1318 disables the flicker compensating circuit 1323 and controls the electronic shutter drive control circuit 906 so that the period of the drive of the image pickup element array 901 will be equal to 1/100 second to execute a flicker compensating process. Under conditions where the output signal from the iris position detecting circuit 1321 represents that the brightness of the object is small, when the control circuit 1318 receives a flicker detection signal from the hold circuit 1115, the control circuit 1318 enables the flicker compensating circuit 1323 to execute a flicker compensating process and controls the electronic shutter drive control circuit 906 to set the drive period to 1/60 second so that a brightness loss caused by the image pickup element array 901 will be minimized.

The iris position detecting circuit 1321 also functions to detect whether or not the detected brightness of the object varies over a predetermined range. When the iris position detecting circuit 1321 detects that the detected brightness of the object varies over the predetermined range, the iris position detecting circuit 1321 outputs a reset signal to the hold circuit 1115 and thus resets the hold circuit 1115 to interrupt a flicker compensating process. When a flicker is detected again, the flicker compensating process is restarted. In the case of a small brightness of an object, a luminance change by flickers are inconspicuous. Thus, enabling and disabling the flicker compensating process in response to the brightness Information suitably prevent a sensitivity reduction.

Under conditions where the output signal from the iris position detecting circuit 1321 represents that the brightness of the object is great, when the motion vectors outputted from the motion vector detecting circuit 911 to the control circuit 1318 represent that the object moves fast, the control circuit 1318 controls the electronic shutter drive control circuit 906 so that the period of the drive of the image pickup element array 901 will be equal to 1/100 second to prevent a lagged-image problem and also to execute a flicker compensating process.

What is claimed is:
1. A motion detector comprising:
a sensor for sensing flickers;
a flicker detection circuit for detecting flickers in response to an output signal from the sensor;

a flicker compensating circuit for removing flicker components from a video signal from an image pickup means in response to an output signal from the flicker detection circuit; and a motion vector detecting circuit for detecting a motion vector in response to an output signal from the flicker compensating circuit.

2. The motion detector of claim 1 wherein the flicker compensating circuit comprises an image pickup device, means for providing a variable electronic shutter to the image pickup device, and means for controlling the variable electronic shutter in response to the output signal from the flicker detection circuit.

3. A motion detector for use in combination with an image pickup device, and means for providing a variable electronic shutter to the image pickup device, the motion detector comprising:

a flicker detection circuit for detecting flicker components in an output signal of the image pickup device;

a hold circuit for holding an output signal from the flicker detecting circuit;

a flicker compensating circuit for removing the flicker components from the output signal of the image pickup device, the flicker compensating circuit comprising means for controlling the variable electronic shutter in response to an output signal from the hold circuit; and a motion vector detecting circuit for detecting a motion vector in response to an output signal from the flicker compensating circuit.

4. The motion detector of claim 3 further comprising a reset circuit for resetting the hold circuit.

5. The motion detector of claim 4 further comprising a power supply switch, and wherein the reset circuit comprises means for resetting the hold circuit in synchronism with an operation of the power supply switch.

6. The motion detector of claim 4 further comprising a color temperature detecting circuit for detecting a color temperature in response to the output signal from the image pickup device, and wherein the reset circuit comprises means responsive to an output signal from the color temperature detecting circuit for resetting the hold circuit when the color temperature detected by the color temperature detecting circuit varies over a predetermined range.

7. An image stabilizing system comprising:
a sensor for sensing flickers;
a flicker detection circuit for detecting flickers in response to an output signal from the sensor;
a flicker compensating circuit for removing flicker components from a video signal from an image pickup means in response to an output signal from the flicker detection circuit;
a motion vector detecting circuit for detecting a motion vector in response to an output signal from the flicker compensating circuit; and
a motion compensating circuit for removing motion components from the video signal in response to the motion vector detected by the motion vector detecting circuit.

8. The image stabilizing system of claim 7 wherein the motion compensating circuit comprises an image pickup device for converting an image of an object into a corresponding electric signal, an image pickup device drive circuit for driving the image pickup device, and an image pickup device drive control circuit for controlling the image pickup drive circuit in response to the motion vector detected by the motion vector detecting circuit.

9. An image stabilizing system for use in combination with an image pickup device, and means for providing a variable electronic shutter to the image pickup device, the motion detector comprising:

a flicker detection circuit for detecting flicker components in an output signal of the image pickup device;

a hold circuit for holding an output signal from the flicker detecting circuit;

a flicker compensating circuit for removing the flicker components from the output signal of the image pickup device, the flicker compensating circuit comprising means for controlling the variable electronic shutter in response to an output signal from the hold circuit;

a motion vector detecting circuit for detecting a motion vector In response to an output signal from the flicker compensating circuit; and a motion compensating circuit for removing motion components from the video signal in response to the motion vector detected by the motion vector detecting circuit.

10. The image stabilizing system of claim 9 wherein the motion compensating circuit comprises an image pickup device drive circuit for driving the image pickup device, and an image pickup device drive control circuit for controlling the image pickup drive circuit in response to the motion vector detected by the motion vector detecting circuit.

11. A video system comprising:
an image pickup device for converting an image of an object into a corresponding electric signal and outputting the electric signal;
means for providing a variable electronic shutter to the image pickup device;
a flicker detection circuit for detecting flicker components of the electric signal outputted by the image pickup device, the flicker components having a period of a plurality of fields;
a hold circuit for holding an output signal of the flicker detection circuit;
a flicker compensating circuit for removing the flicker components from the electric signal outputted by the image pickup device, the flicker compensating circuit comprising means for controlling the variable electronic shutter in response to an output signal of the hold circuit; and
a motion vector detection circuit for detecting a motion vector in response to an output signal of the flicker compensating circuit, the motion vector detection circuit comprising means for storing the output signal of the flicker compensating circuit during a given time, means for comparing an output signal of the storing means and the output signal of the flicker compensating circuit, and means for detecting a motion vector in response to a result of said comparing.

12. The video system of claim 11, further comprising a reset circuit for resetting the hold circuit.

13. The video system of claim 12, further comprising a power supply switch, and wherein the reset circuit comprises means for resetting the hold circuit in synchronism with an operation of the power supply switch.

14. The video system of claim 13, further comprising a color temperature detection circuit for detecting a color temperature in response to the output signal of the image pickup device, and wherein the reset circuit comprises means responsive to an output signal of the color temperature detection circuit for resetting the hold circuit when the color temperature detected by the color temperature detection circuit varies over a predetermined range.

15. The video system of claim 12, further comprising a record switch, and wherein the reset circuit comprises means for resetting the hold circuit in synchronism with an operation of the record switch.

16. The video system of claim 15, further comprising a color temperature detection circuit for detecting a color temperature in response to the output signal of the image pickup device, and wherein the reset circuit comprises means responsive to an output signal of the color temperature detection circuit for resetting the hold circuit when the color temperature detected by the color temperature detection circuit varies over a predetermined range.

17. The video system of claim 12, further comprising a color temperature detection circuit for detecting a color temperature in response to the output signal of the image pickup device, and wherein the reset circuit comprises means responsive to an output signal of the color temperature detection circuit for resetting the hold circuit when the color temperature detected by the color temperature detection circuit varies over a predetermined range.

18. A video system comprising:
a flicker detection circuit for detecting flicker components of an input video signal, the flicker components having a period of a plurality of fields;
a flicker compensating circuit for suppressing the flicker components of the input video signal in response to an output signal of the flicker detection circuit;
a motion vector detection circuit for detecting a motion vector in response to an output signal of the flicker compensating circuit, the motion vector detection circuit comprising means for storing the output signal of the flicker compensating circuit during a given time, means for comparing an output signal of the storing means and the output signal of the flicker compensating circuit, and means for detecting a motion vector in response to a result of said comparing;
a motion compensating circuit for removing motion components from the input video signal; and
control means for controlling the motion compensating circuit in response to the motion vector detected by the motion vector detection circuit;
wherein the motion compensating circuit comprises an image pickup device for converting an image of an object into a corresponding electric signal, an image pickup device drive circuit for driving the image pickup device, and an image pickup device drive control circuit for controlling the image pickup drive circuit in response to the motion vector detected by the motion vector detection circuit.

19. A video system comprising:
an image pickup device for converting an image of an object into a corresponding electric signal and outputting the electric signal;
means for providing a variable electronic shutter to the image pickup device;
a flicker detection circuit for detecting flicker components of the electric signal outputted by the image pickup device, the flicker components having a period of a plurality of fields;
a hold circuit for holding an output signal of the flicker detection circuit;
a flicker compensating circuit for removing the flicker components from the electric signal outputted by the image pickup device, the flicker compensating circuit comprising means for controlling the variable electronic shutter in response to an output signal of the hold circuit;
a motion vector detection circuit for detecting a motion vector in response to an output signal of the flicker compensating circuit, the motion vector detection circuit comprising means for storing the output signal of the flicker compensating circuit during a given time, means for comparing an output signal of the storing means and the output signal of the flicker compensating circuit, and means for detecting a motion vector in response to a result of said comparing; and
a motion compensating circuit for removing motion components from the electric signal outputted by the image pickup device in response to the motion vector detected by the motion vector detection circuit.

20. The video system of claim 19, wherein the motion compensating circuit comprises the image pickup device, an image pickup device drive circuit for driving the image pickup device, and an image pickup device drive control circuit for controlling the image pickup drive circuit in response to the motion vector detected by the motion vector detection circuit.

* * * * *